(12) United States Patent
Middleton et al.

(10) Patent No.: US 8,914,814 B1
(45) Date of Patent: Dec. 16, 2014

(54) INTERCOMMUNICATION IN THE OPEN CONTENT DELIVERY NETWORK FEDERATION

(75) Inventors: Ted Middleton, Moorpark, CA (US); Alexander A. Kazerani, Santa Monica, CA (US)

(73) Assignee: Edgecast Networks, Inc., Santa Monica, CA (US)

( * ) Notice: Subject to any disclaimer, the term of this patent is extended or adjusted under 35 U.S.C. 154(b) by 284 days.

(21) Appl. No.: 13/226,273

(22) Filed: Sep. 6, 2011

Related U.S. Application Data

(60) Provisional application No. 61/524,294, filed on Aug. 16, 2011.

(51) Int. Cl.
*G06F 9/54* (2006.01)

(52) U.S. Cl.
USPC .......................................... 719/328; 718/104

(58) Field of Classification Search
None
See application file for complete search history.

(56) References Cited

U.S. PATENT DOCUMENTS

| | | | |
|---|---|---|---|
| 6,108,703 A | 8/2000 | Leighton et al. | |
| 6,405,252 B1 | 6/2002 | Gupta et al. | |
| 6,442,551 B1 | 8/2002 | Ofek | |
| 6,502,125 B1 | 12/2002 | Kenner et al. | |
| 6,591,266 B1 | 7/2003 | Li et al. | |
| 6,795,868 B1 | 9/2004 | Dingman et al. | |
| 6,799,221 B1 | 9/2004 | Kenner et al. | |
| 7,010,578 B1 | 3/2006 | Lewin et al. | |
| 7,111,057 B1 | 9/2006 | Sherman et al. | |
| 7,185,052 B2 | 2/2007 | Day | |
| 7,340,505 B2 | 3/2008 | Lisiecki et al. | |
| 7,441,045 B2 | 10/2008 | Skene et al. | |
| 7,554,930 B2 | 6/2009 | Gaddis et al. | |
| 7,562,153 B2 | 7/2009 | Biliris et al. | |
| 7,657,622 B1 | 2/2010 | Douglis et al. | |
| 7,660,896 B1 | 2/2010 | Davis et al. | |
| 7,822,871 B2 | 10/2010 | Stolorz et al. | |
| 7,860,964 B2 | 12/2010 | Brady et al. | |
| 8,117,306 B1 | 2/2012 | Baumback et al. | |
| 2002/0078233 A1 | 6/2002 | Biliris et al. | |
| 2002/0116444 A1 | 8/2002 | Chaudri et al. | |
| 2003/0093523 A1 | 5/2003 | Cranor et al. | |
| 2003/0101283 A1* | 5/2003 | Lewis et al. | 709/246 |
| 2003/0115283 A1* | 6/2003 | Barbir et al. | 709/217 |
| 2003/0149581 A1 | 8/2003 | Chaudhri et al. | |
| 2003/0229682 A1 | 12/2003 | Day | |
| 2004/0172466 A1 | 9/2004 | Douglas et al. | |
| 2005/0216569 A1* | 9/2005 | Coppola et al. | 709/213 |
| 2007/0168517 A1 | 7/2007 | Weller et al. | |
| 2007/0174442 A1 | 7/2007 | Sherman et al. | |

(Continued)

OTHER PUBLICATIONS

Cain, Content Network Advertisement Protocol (CNAP), Jan. 1, 2003, p. 1-33.*

(Continued)

*Primary Examiner* — H S Sough
*Assistant Examiner* — Syed Roni

(57) ABSTRACT

Some embodiments provide a capacity exchange whereby capacity from different content delivery networks (CDNs) can be bought, sold, and traded. The capacity exchange is part of an "Open CDN" platform. The Open CDN platform federates the independent operation of CDNs and other operators and service providers to distributed platforms participating in the Open CDN platform. The Open CDN platform includes one or more APIs for facilitating intercommunication between the federation participants by performing configuration mapping, command interoperability, traffic management, and reporting aggregation.

19 Claims, 18 Drawing Sheets

(56) References Cited

U.S. PATENT DOCUMENTS

| | | |
|---|---|---|
| 2007/0250560 A1 | 10/2007 | Wein et al. |
| 2009/0055506 A1 | 2/2009 | Hudson et al. |
| 2009/0172167 A1 | 7/2009 | Drai et al. |
| 2011/0029668 A1 | 2/2011 | Menai |
| 2011/0055370 A1 | 3/2011 | Kern et al. |
| 2011/0060812 A1 | 3/2011 | Middleton |
| 2011/0078230 A1 | 3/2011 | Sepulveda |
| 2011/0078327 A1 | 3/2011 | Li et al. |
| 2011/0131341 A1 | 6/2011 | Yoo et al. |
| 2011/0191477 A1 | 8/2011 | Zhang et al. |
| 2011/0299550 A1 | 12/2011 | Karaoguz et al. |
| 2013/0103556 A1* | 4/2013 | Lyon .................. 705/34 |

OTHER PUBLICATIONS

Turrini, An architecture for content distribution internetwoking, Mar. 2004, p. 1-177.*

* cited by examiner

INTERCOMMUNICATION IN THE OPEN CONTENT DELIVERY NETWORK FEDERATION

CLAIM OF BENEFIT TO RELATED APPLICATIONS

This application claims the benefit of U.S. provisional application 61/524,294, entitled "Open Content Delivery Network Platform with Capacity Exchange", filed Aug. 16, 2011. The contents of Provisional Application 61/524,294 are hereby incorporated by reference.

TECHNICAL FIELD

The present invention relates to content delivery networks.

BACKGROUND ART

Content delivery networks (CDNs) have greatly improved the way content is transferred across data networks such as the Internet. A CDN accelerates the delivery of content by reducing the distance that content travels in order to reach a destination. To do so, the CDN strategically locates surrogate origin servers, also referred to as caching servers or edge servers, at various points-of-presence (POPs) that are geographically proximate to large numbers of content consumers and the CDN utilizes a traffic management system to route requests for content hosted by the CDN to the edge server that can optimally deliver the requested content to the content consumer. Determination of the optimal edge server may be based on geographic proximity to the content consumer as well as other factors such as load, capacity, and responsiveness of the edge servers. The optimal edge server delivers the requested content to the content consumer in a manner that is more efficient than when origin servers of the content publisher deliver the requested content. For example, a CDN may locate edge servers in Los Angeles, Dallas, and New York. These edge servers may cache content that is published by a particular content publisher with an origin server in Miami. When a content consumer in San Francisco submits a request for the published content, the CDN will deliver the content from the Los Angeles edge server on behalf of the content publisher as opposed to the much greater distance that would be required when delivering the content from the origin server in Miami. In this manner, the CDN reduces the latency, jitter, and amount of buffering that is experienced by the content consumer. The CDN also allows the content publisher to offload infrastructure, configuration, and maintenance costs while still having the ability to rapidly scale resources as needed. Content publishers can therefore devote more time to the creation of content and less time to the creation of an infrastructure that delivers the created content to the content consumers.

As a result of these and other benefits, many different CDNs are in operation today. Edgecast, Akamai, Limelight, and CDNetworks are some examples of operating CDNs that are responsible for the delivery of terabytes worth of content. FIG. 1 illustrates a representative infrastructure for some such CDNs. As shown in FIG. 1, the infrastructure includes a distributed set of edge servers 110, traffic management servers 120, and an administrative server 130. The figure also illustrates the interactions that CDN customers including content publishers have with the CDN and interactions that content consumers or end users have with the CDN.

Each edge server of the set of edge servers 110 may represent a single physical machine or a cluster of machines. The cluster of machines may include a server farm for a geographically proximate set of physically separate machines or a set of virtual machines that execute over partitioned sets of resources of one or more physically separate machines. The set of edge servers 110 are distributed across different edge regions of the Internet to facilitate the "last mile" delivery of content. The edge servers run various processes that (1) manage what content is cached, (2) how content is cached, (3) how content is retrieved from the origin server when the content is not present in cache, (4) monitor server capacity (e.g., available processor cycles, available memory, available storage, etc.), (5) monitor network performance (e.g., latency, downed links, etc.), and (6) report statistics on the delivered content. The set of edge servers 110 may provide the monitoring information to the traffic management servers 120 to facilitate the routing of content consumers to the optimal edge servers. The set of edge servers 110 may provide the statistical data to the administrative server 130 where the data is aggregated and processed to produce performance reports for the delivery of the customers' content.

The traffic management servers 120 route content consumers, and more specifically, content consumer issued requests for content to the one or more edge servers. Different CDN implementations utilize different traffic management schemes to achieve such routing to the optimal edge servers. Consequently, the traffic management servers 120 can include different combinations of Doman Name System (DNS) servers, load balancers, and routers performing Anycast or Border Gateway Protocol (BGP) routing. For example, some CDNs utilize the traffic management servers 120 to provide a two-tiered DNS routing scheme, wherein the first DNS tier resolves a DNS request to the CDN region (or POP) that is closest to the requesting content consumer and the second DNS tier resolves the DNS request to the optimal edge server in the closest CDN region. As another example, some CDNs use Anycast routing to identify the optimal edge server.

The administrative server 130 may include a central server of the CDN or a distributed set of interoperating servers that perform the configuration control and reporting functionality of the CDN. Content publishers register with the administrative server 130 in order to access services and functionality of the CDN. Accordingly, content publishers are also referred to as customers of the CDN. Once registered, content publishers can interface with the administrative server 130 to specify a configuration, upload content, and view performance reports. As part of registration and in order to utilize functionality of the CDN, the content publisher may be required to perform local configuration changes. In some instances, the content publisher inserts a CNAME into its domain's authoritative DNS server such that DNS requests for the content publisher's content are resolved by the traffic management servers 120 of the CDN. Other configuration changes by the content publisher may also be necessary to facilitate the offloading of content to the CDN. One such configuration change involves the content publisher prepending a CDN provided Uniform Resource Locator (URL) to the existing URLs for objects hosted by the content publisher origin server. For example, the URL www.pub1.com/object1.jpg will be modified to www.cdn1.com/cid/params/www.pub1.com/object1.jpg. The modified URL causes content consumers to request the object (i.e., object1.jpg) from the CDN domain rather than the content publisher domain. Moreover, the edge servers of the CDN can identify the content that is being requested and the origin server from which to retrieve the requested content should the content not be cached at the edge server.

As noted above, the administrative server 130 is also typically tasked with statistics aggregation and report generation. Specifically, the administrative server 130 aggregates statistics data from each server of the set of edge servers 110 and processes the statistics to produce usage and performance reports. From these reports, the content publisher can better understand the demand for its content, the performance provided by the CDN in delivering the content publisher's content, and the need for capacity reallocation, among other uses.

While many benefits can be achieved from the current CDN model, there are also many shortcomings and restrictions that are inherent with this model. Firstly, the global footprint for any CDN is limited because of infrastructure costs. Instead of deploying edge servers at every edge, state, city, etc., each CDN strategically picks and chooses the regions at which its edge servers are to be deployed. This has led to CDN localization, wherein different CDNs have the infrastructure to best serve different regions. For example, a first CDN may be best for delivering content across the United States and Western Europe, a second CDN may be best for delivering content across South America, and a third CDN may be best for delivering content across Eastern Europe. Another factor precluding the expansion of a CDN is that a particular ISP or network operator can prevent the CDN from establishing a POP or deploying edge servers at certain geographic regions that are controlled by that ISP or network operator. Specifically, the ISP may run its own CDN at the geographic regions under its control and as a result, the ISP will want to avoid any direct competition by preventing another CDN from establishing a POP at those geographic regions. Additionally, the ISP may enter into an exclusive agreement with a first CDN, whereby the first CDN is permitted to establish a POP within a region that is under the control of the ISP while a second CDN is prevented from doing so.

Secondly, CDNs are confronted with a "chicken and egg" problem. A CDN will not expand its infrastructure to a region where there is little to no demand and content publishers and other CDN customers will not utilize the services of a CDN unless there is sufficient infrastructure already in place to accommodate their needs. This has further exacerbated CDN localization. Specifically, larger CDNs do not expand their infrastructure to smaller markets where there is little to no demand, thus allowing for new and smaller CDNs to pop up and service those smaller markets.

Thirdly, CDNs are themselves faced with scalability and capacity issues. This is especially problematic for CDNs that face spikes in demand at specific regions. For example, a majority of demand for a live stream of a local sports team may come from the particular region where the sports team is based. Even though the CDN may have unused capacity and resources at several of its POPs, the POP closest to the particular region can be overwhelmed causing demand to overflow to more remote POPs thereby lowering the overall effectiveness of the CDN. CDNs are hesitant to partner with another CDN because they are in direct competition with one another and partnering with another CDN can lead to customer poaching. Some content publishers have employed the services of two or more CDNs at the same time when a single CDN does not have sufficient capacity at a region to fully service the needs of the content publishers, or to meet commercial interests. This however leads to undesired overhead for the content publishers. Specifically, the content publishers are required to configure and publish their content to the two or more CDNs. Different configurations may be necessary based on the infrastructures of the CDNs. The content publishers are also confronted with different service rates and different performance from each of the CDNs. This further leads to the content publishers receiving disparate and non-conforming reports from each of the CDNs such that it is difficult for the content publishers to ascertain the overall performance and holistic view for the delivery of their content.

Furthermore, the current CDN operational model ties the role of the CDN operator to the role of the CDN service provider. More efficient usage and monetization of the capacity and resources of the CDN operator would be achieved if multiple CDN service providers were allowed access to the capacity and resources of the CDN operator. Specifically, rather than have companies like Akamai, Edgecast, Limelight, etc. act as both a CDN operator and a CDN service provider, it would be more advantageous to allow third party service providers the ability to sell the capacity of the CDN operators. This is particularly the case when Internet Service Providers (ISPs) deploy CDN infrastructure for their own objectives and the ISPs end up with spare capacity within their network, when the ISPs implement CDN functionality within their networks with the express desire to recognize commercial value from the content flowing into their networks from other CDN operators, or when the ISPs consolidate the number of different CDN infrastructures from various CDN service providers that are deployed into their networks. This improved operational model affords advantages to both the CDN operators and the CDN service providers including increased utilization of the CDN operators capacity while allowing the CDN service provider, whoever it may be, to realize the advantages of a CDN without the need to develop the optimized software and without the need to deploy the infrastructure necessary to operate a CDN.

In light of the foregoing, there is a need for a new CDN operational model that improves upon the content delivery capabilities of existing CDNs. There is a need for such a CDN operational model to provide the CDN service provider the ability to scale capacity on-demand without purchasing new infrastructure and without imposing additional overhead on the customer. There is further a need to provide the CDN service provider the ability to expand its presence on-demand beyond the infrastructure and capabilities of a given CDN operator to regions where that CDN operator does not have an established POP. Moreover, there is a need to better utilize the existing capacity of CDN operators to avoid sunk costs from unused capacity.

SUMMARY OF THE INVENTION

Some embodiments provide a content delivery network (CDN) capacity exchange whereby capacity from different CDNs can be bought, sold, and traded. The capacity exchange is part of an "Open CDN" platform in which any Open CDN participant (OCDNP) including a CDN operator, a CDN service provider (CDNSP), or other provider of cloud or distributed network services can (1) dynamically scale its capacity, (2) expand its reach beyond the infrastructure of a single CDN into geographic regions that the CDN has yet to physically establish a point of presence (POP) in, and (3) reduce sunk costs associated with unused capacity of already deployed CDN infrastructure by selling that unused capacity to other OCDNPs that are in need of the capacity. In this manner, the Open CDN platform facilitates a collaboration and synergy of existing CDN infrastructure and capacity with multiple different CDNSPs.

To participate in the capacity exchange as a seller of capacity, an OCDNP defines a service instance. The service instance specifies an amount of available capacity that the CDN is willing to make available to the capacity exchange along with service attributes that categorize the capacity. In some embodiments, the Open CDN platform activates one or more verification probes to verify the capacity of the service instance defined by the CDN, before publishing that service instance to the capacity exchange. The measurements performed by the verification probes are then published to the exchange in conjunction with the defined service instance.

OCDNPs participating in the capacity exchange as buyers of capacity can search the exchange based on the categorizations of the service instances in order to identify service instances that meet their qualifications for additional capacity. OCDNPs can then purchase an identified service instance. The capacity exchange brokers the purchase using one of a variety of pricing plans supported by the exchange. Some supported pricing plans include (1) a first-in pricing plan, (2) a highest bid pricing plan, (3) a decaying pricing plan, (4) a tiered pricing plan, and (5) an any price auctioning plan. Moreover, pricing can be specified with a "wholesale rate" to specify an OCDNP to capacity exchange rate and a "retail rate" to specify an OCDNP to OCDNP exchange rate.

In some embodiments, a search that is submitted by a potential capacity buyer can be saved to the exchange as a capacity request. Capacity sellers then engage in the capacity exchange to identify capacity requests with qualifications that align with the sellers' available capacity. The sellers can then enter a reverse bidding process or other transactional arrangements to sell capacity to the buyers. The capacity request allows for instantaneous or deferred capacity transactions.

In some embodiments, the Open CDN platform manages the allocation and configuration of a service instance that was successfully sold or auctioned through the capacity exchange. The Open CDN platform assigns unique identifiers to each OCDNP participant, each service instance, and each customer of each OCDNP who has a configuration exposed to a foreign CDN (i.e., foreign OCDNP), wherein an exposed configuration includes a customer configuration that has been deployed to capacity that was acquired through the capacity exchange. The unique identifiers provide a mechanism with which to deploy and monitor customer configurations across the Open CDN platform and the participating OCDNPs.

In some embodiments, each OCDNP is enhanced with a connector agent and an Open CDN application programming interface (API). In some other embodiments, the Open CDN API is integrated at a central Open CDN server of the Open CDN platform and each connector agent of each OCDNP is configured to intercommunicate through the central Open CDN API. The connector agent uses the Open CDN API to perform various mapping operations (1) to translate between native OCDNP identifiers and the Open CDN platform identifiers and (2) to facilitate intercommunication between the OCDNP and the Open CDN platform including intercommunication between two or more OCDNPs. Such intercommunication involves (1) the passing and deployment of a customer configuration between two or more OCDNPs, (2) the passing and execution of operational commands between two or more OCDNPs, and (3) the passing and reporting of statistical data between two or more OCDNPs. The Open CDN API is used to prune, clean, and standardize the statistical data that is aggregated from a first OCDNP before combining the statistical data with statistical data of at least a second OCDNP. This produces a uniform report for a customer that has a configuration deployed across multiple OCDNPs. The uniform report provides a holistic view for the performance and utilization of the customer's configuration when the configuration is deployed across multiple OCDNPs. Moreover, based on the aggregated statistical data, the Open CDN platform can produce a comprehensive usage report that can be used for billing or chargeback purposes for an OCDNP or OCDNP customer even when the configuration of the customer is deployed across different OCDNPs. In addition, certain statistical data collected from each OCDNP may be used for operational aspects of the Open CDN platform such as the management of traffic between OCDNPs, monitoring of service levels, load and capacity feedback, and other operations necessary for the OCDNPs to operate in a cohesive manner.

To facilitate inter-OCDNP configurations, the Open CDN platform provides a global traffic management service that integrates with existing traffic management services of each OCDNP. The global traffic management service seamlessly and optimally routes content requests between two or more OCDNPs when a particular customer's configuration has been deployed to each of the OCDNPs. In some embodiments, the global traffic management service performs a first routing determination to pass a content request to the OCDNP that can optimally service the content request. Then, the existing traffic management service for that OCDNP takes over and performs a second routing determination to select the optimal edge server for servicing the request. In some other embodiments, the global traffic management service directly performs the content request routing on behalf of the OCDNPs.

In preferred embodiments, each OCDNP retains its own set of customers and provides CDN service directly to those customers. When additional capacity is needed, such capacity is purchased by the OCDNP and then used to scale a customer configuration without the customer being aware that its configuration has been fully or partially deployed using capacity of another OCDNP. This promotes CDN operator and CDN service provider participation within the Open CDN platform while preventing customer poaching. Moreover, OCDNPs can continue their day-to-day operations as normal, keep a majority of their infrastructure and operation private, and interact with the Open CDN platform only as necessary (i.e., to purchase and configure additional capacity or to sell unused capacity).

In some embodiments, the capacity exchange directly sells capacity to customers. In some such embodiments, a customer specifies qualifications desired for the delivery of its content. The Open CDN platform searches through the service instances published to the capacity exchange in order to identify one or more service instances that most closely match the qualifications specified by the customer. When a match is identified, the service instance is purchased and the purchased capacity is allocated and configured according to the customer configuration. In this manner, the customer obtains desired capacity without having to compare services offered by individual CDNs. The customer is also provided more competitive pricing as service instances from the lowest cost CDNs can be pooled together and used to deploy the customer configuration.

In some embodiments, the Open CDN platform is implemented using a centralized framework. In the centralized framework, each OCDNP is enhanced with a connector agent that communicably couples the OCDNP to a centralized Open CDN server. The Open CDN server hosts the Open CDN API and performs the necessary mappings to facilitate inter-OCDNP communication. The Open CDN server also hosts the capacity exchange for the buying, selling, and trading of capacity.

In some embodiments, the Open CDN platform is implemented using a distributed framework. In the distributed framework, each OCDNP is enhanced with a connector agent and an Open CDN API such that the mappings for inter-OCDNP communication are performed locally. In the distributed framework, the capacity exchange is hosted by a designated OCDNP participant or by the Open CDN server.

BRIEF DESCRIPTION OF THE DRAWINGS

In order to achieve a better understanding of the nature of the present invention, a preferred embodiment for the Open CDN platform will now be described, by way of example only, with reference to the accompanying drawings in which.

DETAILED DESCRIPTION

Figure 1:
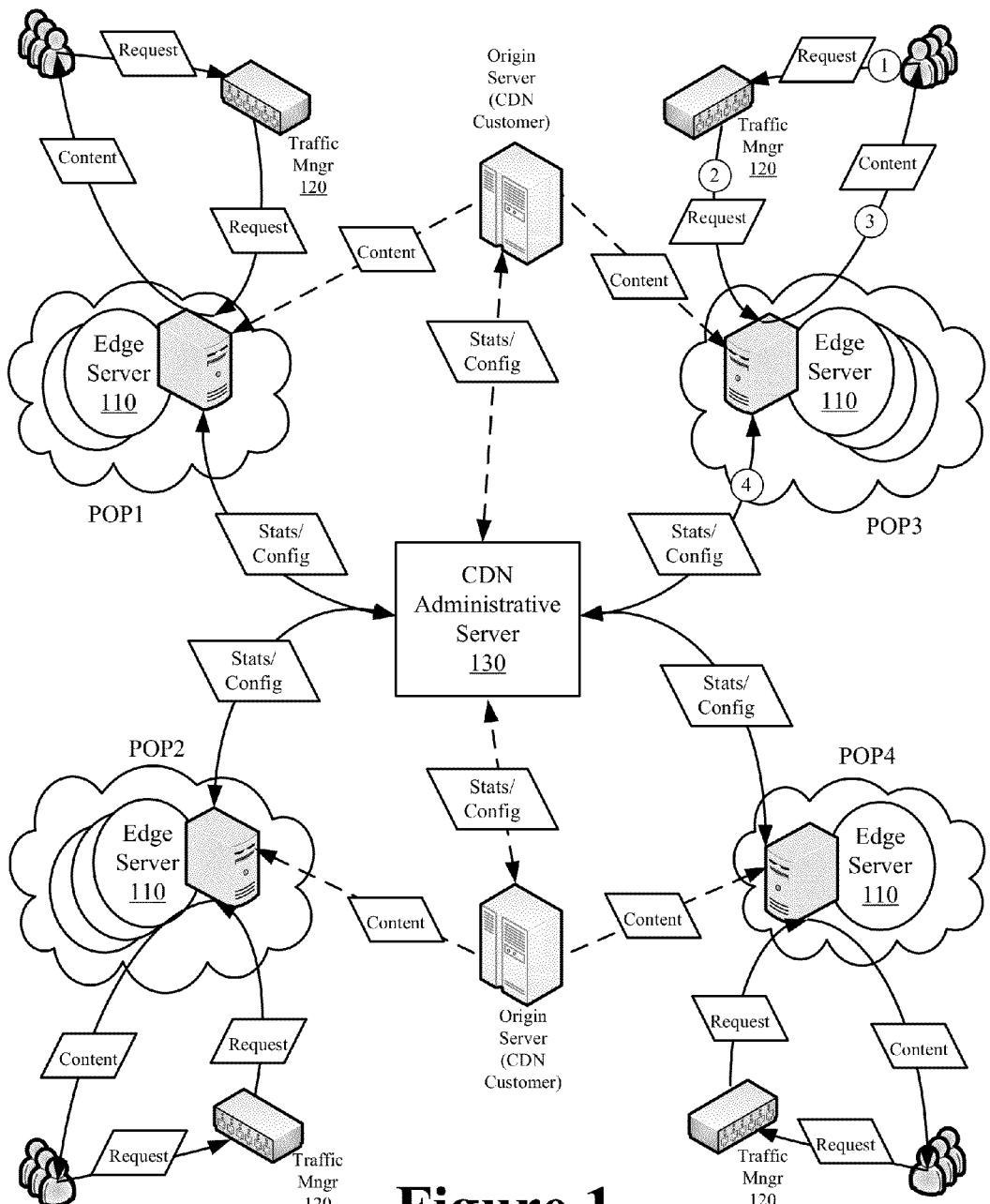
FIG. 1 illustrates a representative infrastructure for some CDNs.

In the following detailed description, numerous details, examples, and embodiments of an Open CDN platform is set forth and described. As one skilled in the art would understand in light of the present description, the Open CDN platform is not limited to the embodiments set forth, and the Open CDN platform may be practiced without some of the specific details and examples discussed. Also, reference is made to the accompanying figures, which illustrate specific embodiments in which the invention can be practiced. It is to be understood that other embodiments can be used and structural changes can be made without departing from the scope of the embodiments herein described.

To aid in the discussion below, the term Open CDN participant (OCDNP) is defined to include any network operator, any service provider, any provider of hosting, caching, or cloud services, and any operator of a distributed platform that operates a distributed set of servers that participate in the Open CDN platform by either providing capacity to the other participants or by utilizing capacity of another participant. Some OCDNPs envisioned to participate in the capacity exchange include content delivery networks (CDNs) such as Edgecast, Akamai, Limelight, CDNetworks, and Mirror Image. Other OCDNPs that can participate in the capacity exchange include Amazon CloudFront, Amazon EC2, AT&T, and Web.com. Also, the terms native and foreign are used. Native refers to the host OCDNP for a customer. In other words, the customer is registered with the native OCDNP and directly receives service from the native OCDNP. As will be described in further detail below, the native OCDNP can offload some or all of the customer's configuration or services to a non-host OCDNP or foreign OCDNP. The foreign OCDNP services the customer on behalf of the native OCDNP in a manner that is seamless and transparent to the customer of the native OCDNP.

I. Capacity Exchange

Some embodiments provide a CDN capacity exchange whereby capacity from different OCDNPs can be bought, sold, and traded. As used herein, capacity refers to the ability of a particular OCDNP to deliver content on behalf of a content originator or content publisher. Capacity is determined from the availability of disparate resources and disparate service attributes related to those resources. Resources that comprise a construct or measure of capacity include processor cycles, memory, bandwidth, throughput, and services (e.g., caching of static content, caching of dynamic content, application services, media streaming, secure content delivery, etc.). Service attributes qualify the application of capacity. These service attributes may include identifying a geographic region that the capacity covers, identifying the time of day that the capacity is available, identifying the duration for the availability of capacity, and identifying the one or more points of presence (POPs) or edge servers that provide the capacity as some examples. A geographic region represents any definable area such as a continent, country, state, city, zipcode, municipality, and any other contiguous or noncontiguous area of arbitrary size. The geographic region may be used to represent (1) the geographic region that is "covered" by the capacity, (2) a commercial region associated with a set of pricing/economic terms, or (3) a combination of (1) and (2) as defined by the OCDNP seller of the service instance.

In the Open CDN platform, each addressable unit of capacity that OCDNPs exchange in the capacity exchange is referred to as a "service instance". A service instance may be represented by a CNAME, but is ultimately resolved to an Internet protocol (IP) address or a virtual IP (VIP) address. A service instance can be granularly defined to comprise capacity of a single server, a cluster of servers, one or more POPs, a geographic region, or a regional Anycast VIP address as some examples. In instances where a service instance is defined using capacity of multiple servers, the address for the service instance (e.g., hostname, IP, and VIP) may be directed to a load balancer or other traffic management service that autonomously manages traffic allocation across the servers of the service instance.

In some embodiments, the Open CDN platform has certain defined and/or required service attributes that all service instances use to ensure consistent interpretation by OCDNPs (i.e., the capacity exchange buyers and sellers). The preferred embodiment is designed to serve as an extensible framework such that future functions not yet implemented can be added to the Open CDN platform in a flexible way without disrupting pre-existing functionality. Some service attributes may be defined as required, reserved, system, optional, or multi-value. Required means that the service attribute must be specified for all service instances. Reserved means that the service attribute has a defined meaning by the Open CDN platform. System means that the value of the service attribute is supplied by the Open CDN platform or the OCDNP. Optional means that the service attribute need not have a value and is informational in nature. Multi-value means that there may be more than one name-value pair with the same name associated with the service instance. In addition, OCDNPs may be able to provide "private" service attributes which serve as metadata for informational, tracking, categorization, or other purposes not directly anticipated by the preferred embodiment. As should be evident based on the foregoing, capacity is a construct or measure that can be defined differently based on the different sets of resources and service attributes that are associated with the construct or measure of capacity.

The capacity exchange is part of an "Open CDN" platform in which any OCDNP participating in the capacity exchange can (1) dynamically scale its capacity, (2) expand the reach of its CDN into previously untapped geographic regions without physically establishing POPs at those geographic regions, and (3) reduce sunk costs associated with unused capacity of already deployed infrastructure by selling that unused capacity to other OCDNPs that are in need of additional capacity. Specifically, the capacity exchange is a marketplace for OCDNPs to make their unused capacity available for other OCDNPs to purchase, configure, and use.

Figure 2:
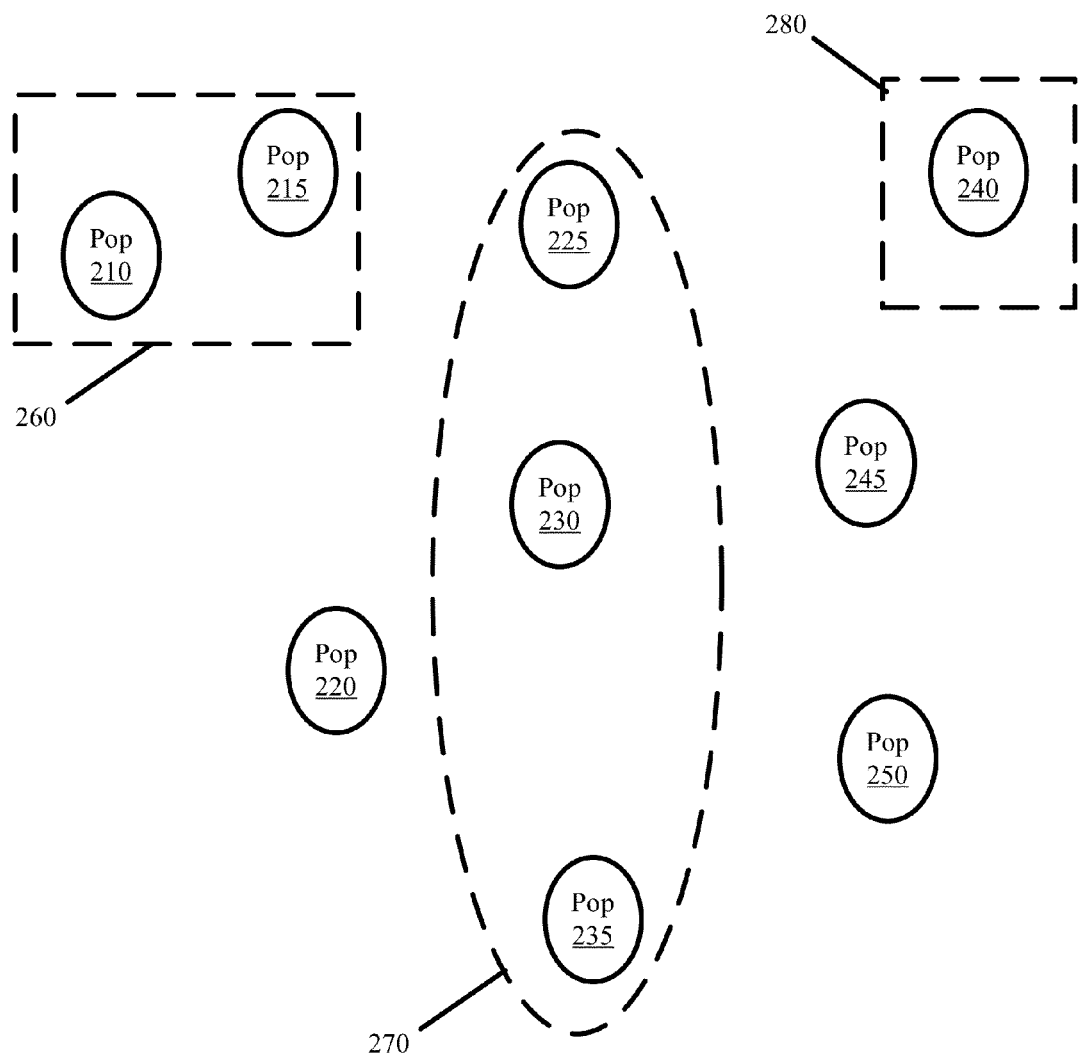
FIG. 2 conceptually illustrates defining different service instances that can be bought, sold, or exchanged in the capacity exchange of the Open CDN platform in accordance with some embodiments.

FIG. 2 conceptually illustrates defining different service instances that can be bought, sold, or exchanged in the capacity exchange of the Open CDN platform in accordance with some embodiments. FIG. 2 illustrates geographically distributed POPs 210, 215, 220, 225, 230, 235, 240, 245, and 250 of a particular OCDNP and different service instances 260, 270, and 280 that are defined based on the available capacity at some of the POPs. Specifically, service instance 260 is defined with available capacity at POPs 210 and 215; service instance 270 is defined with available capacity at POPs 225, 230, and 235; and service instance 280 is defined with available capacity at POP 240. It should be apparent be apparent that a service instance can be defined with more or less granularity. For example, a service instance can be defined with available capacity at one or more specific edge servers within one or more POPs or a service instance can be defined with available capacity at an entire geographic region that is serviced by multiple POPs.

Each service instance made available to the capacity exchange is uniquely identified with a service instance identifier (OCDN_SIID). The OCDN_SIID can be a multi-digit hexadecimal value. In some embodiments, the OCDN_SIID is formatted as OCDN_SIID=OCDN_SPID:SIID wherein the OCDN_SPID is a unique identifier assigned to each OCDNP participant in the Open CDN platform and the SIID is a number that is assigned by the OCDNP offering the service instance, wherein the SIID uniquely identifies the service instance within the OCDNP or within the Open CDN platform.

In some embodiments, the service instance may be assigned any variable number of service attributes. The service attributes comprise name value pairs that describe metadata about the service instance. Service attributes refine the application of capacity and can be used as searchable fields for aligning the qualifications of potential buyers of capacity with the appropriate service instance(s).

Figure 3:
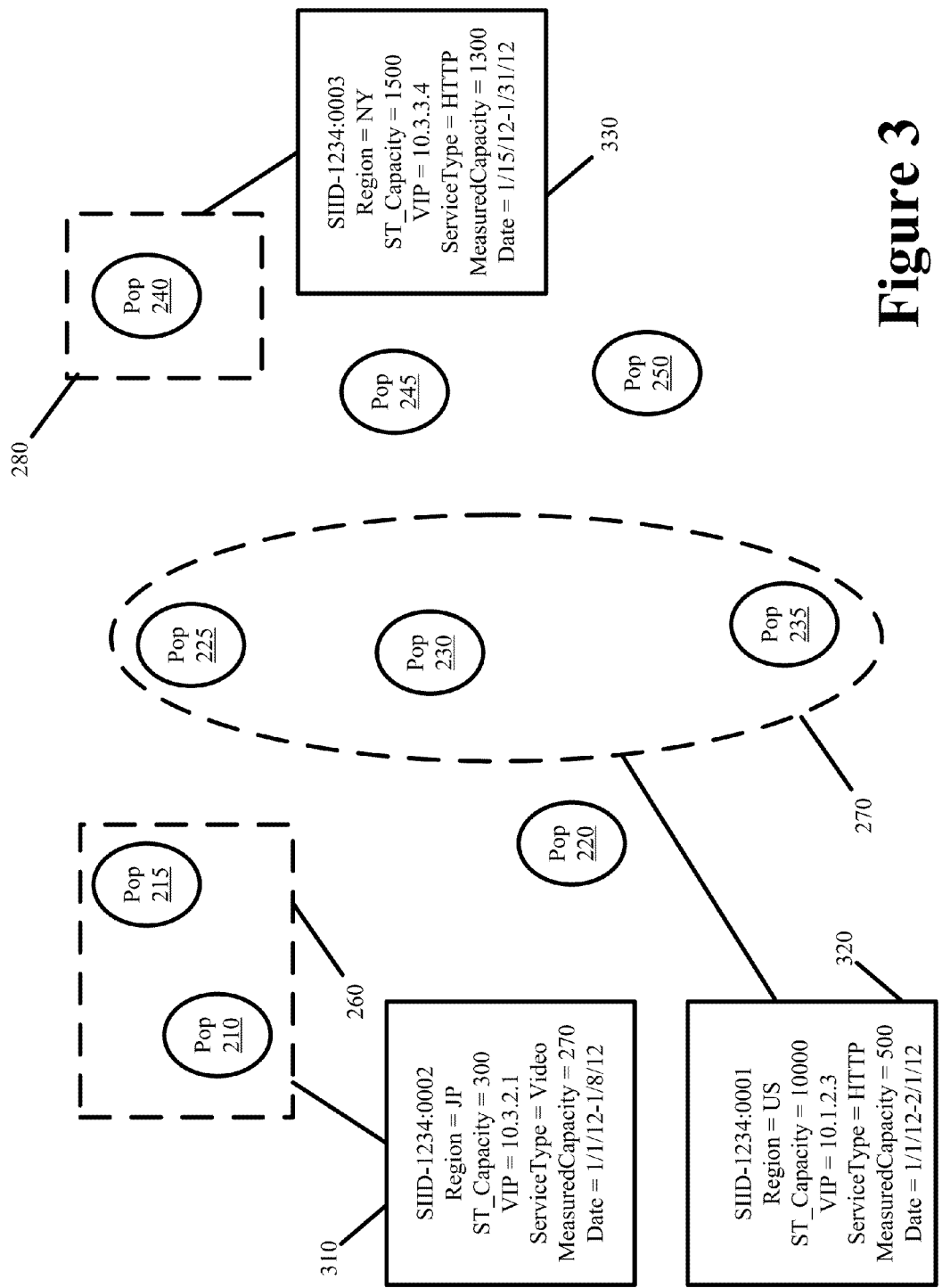
FIG. 3 conceptually illustrates a set of service attributes defined for each of the service instances of FIG. 2 in accordance with some embodiments.

FIG. 3 conceptually illustrates a set of service attributes defined for each of the service instances 260, 270, and 280 of FIG. 2 in accordance with some embodiments. Specifically, the set of service attributes 310 are defined for service instance 260, the set of service attributes 320 are defined for service instance 270, and the set of service attributes 330 are defined for service instance 280. The set of attributes 310, 320, and 330 include: (1) OCDN_Region to specify a code that represents the geographic region that is associated with the service instance, wherein the code is anticipated to be a multi-value attribute to allow for increasingly granular regional definitions, (2) OCDN_StatedCapacity to specify the allocated or assigned capacity for the service instance as estimated by the OCDNP offering the service instance, (3) OCDN_VIP for the VIP assigned to the service instance, (4) OCDN_ServiceType to specify the type of service (e.g., HTTP, HTTPS, FMS, etc.) that is supported by the associated service instance, (5) OCDN_MeasuredCapacity to specify the current value of the assessed capacity of the service instance as monitored by the Open CDN platform, (6) OCDN_Date to specify the dates when the service instance is available. It should be apparent to one of ordinary skill that other service attributes may be defined in addition to or instead of those illustrated in FIG. 3. For example, some additional service attributes may include: OCDN_Status to specify the availability status for the service instance, OCDN_Sharing to specify whether the service instance is available for bundling or partitioning, OCDN_Hostname to specify the resolvable hostname that represents the service instance (to be used if a secondary Domain Name System (DNS) based traffic management system will perform additional request routing outside the control of the Open CDN traffic management system), and OCDN_CapFeedback_URL to specify the URL from which current capacity or performance statistics for the service instance can be obtained. Certain service attributes can have different definable parameters.

In addition to specifying the service attributes, the OCDNP seller of a service instance specifies a price plan for the service instance. A price plan will contain information that defines one or more ways in which the capacity associated with the service instance can be purchased. A price plan contains at a minimum an effective date range and a cost or cost parameters. The effective date range specifies when the capacity associated with the service instance is available. The cost or cost parameters specifies the price, price ranges, or price tiers to acquire the capacity associated with the service instance. In some embodiments, the cost or cost parameters are defined according to one of the following price plans include: (1) a first-in price plan whereby bids that are at or above the ask price are accepted in the order that they are received until capacity associated with a service instance is depleted, (2) a highest bid price plan whereby bids are accepted from the highest bid price to the lowest bid price until capacity associated with a service instance is depleted, (3) a decaying price plan whereby the ask price specified for a service instance by an OCDNP is automatically decreased in intervals as the expiration window for the service instance approaches, (4) a tiered price plan whereby a rate structure is established based on bid volume with different rates associated with each bid volume tier, and (5) an any price plan that accepts bids from highest to lowest price in order to auction a service instance to the highest bidder.

The cost or cost parameters can be defined according to (1) a "wholesale rate" or (2) a "retail rate". In some embodiments, the wholesale rate specifies an OCDNP to capacity exchange rate and the retail rate specifies a higher rate for the capacity exchange to publish and sell the service instance at. The difference between the wholesale and retail rates is used in some embodiments to cover a service fee or a transaction fee for the capacity exchange to broker the exchange of capacity. The fee may also cover other services provided by the Open CDN platform (e.g., capacity allocation, statistics reporting, API maintenance, etc.). In some embodiments, the wholesale rate specifies an OCDNP cost for the capacity and the retail rate specifies a higher saleable price for that capacity that prevents OCDNP buyers from being able to resell capacity at a cost that would undermine the OCDNP seller's costs.

Figure 4:
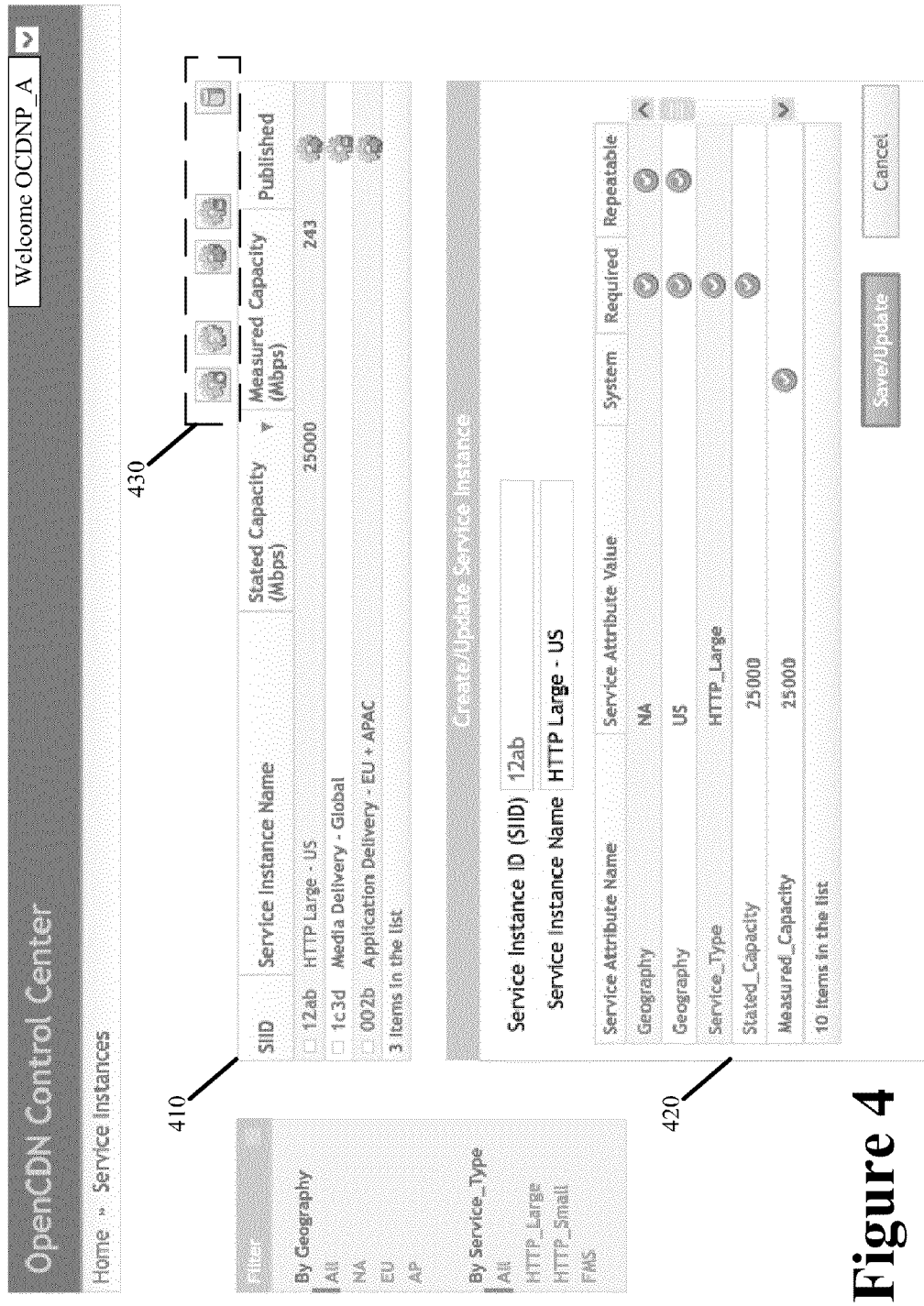
FIG. 4 presents an exemplary interface for defining a service instance in accordance with some embodiments.

In some embodiments, a service instance is defined using a web interface that is provided by an interface portal of the Open CDN platform. FIG. 4 presents an exemplary interface for defining a service instance in accordance with some embodiments. The interface includes a first view 410, a second view 420, and a set of tools 430. The first view 410 displays service instances that have been previously defined by an OCDNP. As shown, the first view 410 includes three defined service instances with each defined service instance having an assigned service instance identifier, a name for identifying the service instance, OCDNP stated capacity, verified capacity measured by the Open CDN platform, and status information as to whether the service instance has been published to the capacity exchange. Service attributes for a currently selected service instance are shown in the second view 420. In this figure, the second view 420 illustrates the service attributes that have been specified for the first defined service instance. As shown, the service attributes include the OCDN_Region (see Geography), OCDN_ServiceType, OCDN_StatedCapacity, and OCDN_MeasuredCapacity. OCDNP specified service attributes can be modified by selecting the corresponding service attribute value and entering a new value. The set of tools 430 control (1) the creation of a new service instance, (2) the publishing of a defined service instance, (3) the removal of a published service instance from the capacity exchange, and (4) the deletion of a defined service instance.

Once a service instance is defined, some embodiments of the Open CDN platform activate one or more verification probes to verify the available capacity specified for the service instance. The verification is performed because the OCDN_StatedCapacity attribute is an estimation of the capacity for a service instance as assigned by the OCDNP seller, where the estimation may be based on the number of servers or other resources physically provisioned and logically configured into the service instance. This estimate fluctuates and can be unreliable since capacity in the service provider's CDN varies widely based on a significant number of factors that vary with the type of content, request rate, and other factors not directly attributable to the service instance at the time of its provisioning. Therefore, the capacity exchange uses the verification probes to ensure a predefined and universally consistent measurement of the capacity, load, and headroom associated with all elements of capacity that contribute to the service instance's overall capacity and to provide a trended verification that the OCDN_StatedCapacity is actually observed to be accurate over time. In so doing, capacity purchasers are better able to assess the validity of the estimated remaining and future capacity of a service instance.

In some embodiments, the verification probes are a set of machines or processes that are distributed throughout the Internet and that are controlled by the Open CDN platform. The verification probes perform and/or collect various measurements to derive independent measures of the available capacity for the OCDNP defined service instance based on up-to-date network conditions and server resources. Some measurements include pinging the servers associated with the service instance to obtain latency measurements and downloading a beacon object to calculate throughput and overall capacity for the service instance. In addition to or instead of the active external measurements performed by the verification probes, various resource measurements from within each edge server or POP are generated and transmitted to and collected by the verification system.

The measurements performed by the verification probes are then published in conjunction with the OCDNP defined service instance to the capacity exchange. In some embodiments, publishing the service instance comprises storing the service instance definition to a database of the Open CDN platform that stores all published service instances. Verification can be performed before the service instance is published to the capacity exchange or at any time after the service instance is published to the capacity exchange. Some embodiments periodically verify the published service instances to reflect measured changes in network conditions and server resources over time.

To purchase some or all of a service instance, a OCDNP buyer first searches the capacity exchange using a web interface that is provided by the interface portal of the Open CDN platform. The OCDNP buyer formulates a query that specifies various qualifications including desired service attributes for the desired capacity. The qualifications can specify desired capacity, geographic regions, pricing, performance, service type, and availability dates as some examples. Upon receiving the query, the capacity exchange identifies published service instances that have service attributes meeting the buyer's specified qualifications. In preferred embodiments, the search is implemented using an "intersection" query. Such a query identifies the intersection of all service instances that match all service attribute name and value pairs (i.e., qualifications) specified in the search query. The resulting set of service instance identifiers is a list of all published service instances known to the capacity exchange that match the qualification supplied by the prospective purchaser.

Next, the capacity exchange analyzes a capacity allocation table associated with each identified service instance to determine whether sufficient capacity is actually available during a time period required by the buyer. The capacity allocation table identifies the amount of stated capacity that is available for a particular service instance at different periods of time. In some embodiments, the capacity allocation table tracks "puts" and "takes" to the particular service instance. A put identifies at least an amount of capacity and a time period in which the service instance seller adds capacity to the service instance. For example, a seller defines a service instance with 1,000 Mbps capacity for a three month duration at a particular POP. Subsequently, the seller obtains another 100 Mbps of capacity at that POP during the final month of the service instance. The seller then issues a put to add that additional 100 Mbps to the final month of the defined service instance. A take identifies a portion of the service instance that has been purchased. A take identifies at least an amount of capacity, a time period, a buyer identifier, a purchase price, and a capacity agreement identifier. A take can identify some amount of capacity that is less than the full amount of stated capacity for a service instance and in this manner, buyers can purchase portions of capacity from a service instance without purchasing the entirety of offered capacity. The remaining capacity of the service instance will be available for other buyers to purchase.

Based upon the analysis of the capacity allocation table for the service instances that are identified to satisfy the buyer's search criteria, the service instances are presented with one or more values that quantify the availability of capacity during the time period required by the buyer. For example, a service instance may be presented with a single value that quantifies the minimum amount of available capacity for the service instance during the time period qualified by the buyer. As another example, the service instance may be presented with minimum, average, and maximum values that quantify the available capacity for the service instance to better represent the puts and takes associated with that service instance during the time period qualified by the buyer. The buyer can proceed to purchase some or all of the available capacity of the service instance. To do so, the buyer submits an offer to purchase an identified service instance or engages in a bidding auction for that identified service instance using the interface portal of the Open CDN platform.

In some embodiments, if the purchase offer is approved, the buyer is provided confirmation and a contract is executed to enforce the transaction. This contract is stored in the capacity exchange as a capacity agreement. The capacity agreement specifies the terms for the contractual relationship between the capacity seller and the capacity buyer. These terms include identification of the acquired capacity including a date range, capacity purchased, capacity units, and capacity rate. The buyer can be charged an upfront fee for the purchase of the entirety or portion of the service instance. Alternatively, the capacity agreements can be used by a usage mediation and settlement facility of the capacity exchange to compute billing information to be applied to each OCDNP during each settlement cycle. In some embodiments, the capacity exchange operates to escrow a fee paid by the buyer until the end of a settlement cycle. This ensures that the seller is paid only upon performing per the terms of the capacity agreement. Additionally, the buyer may be charged a fluctuating fee that includes a first fee for total capacity of a service instance that was reserved during the settlement cycle and a second fee for the actual usage of that reserved capacity.

Figure 5:
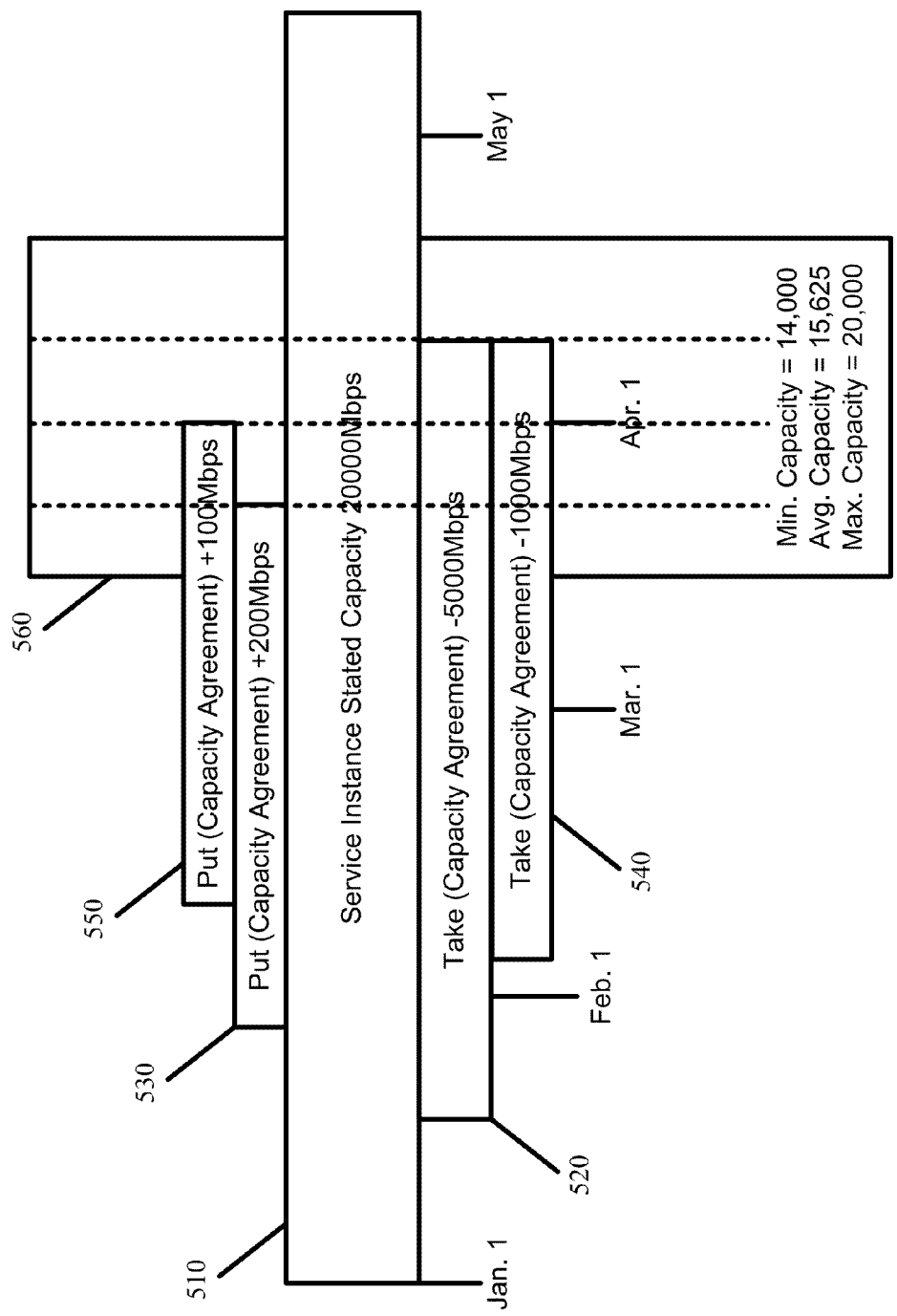
FIG. 5 conceptually illustrates a capacity allocation table for a service instance that is published to the capacity exchange in accordance with some embodiments.

As part of the sale of capacity from a service instance, the capacity exchange also updates the capacity allocation table for that service instance. Specifically, each portion of the service instance that is sold causes a new take to be entered in the capacity allocation table. FIG. 5 conceptually illustrates a capacity allocation table for a service instance that is published to the capacity exchange in accordance with some embodiments. The capacity allocation table identifies a service instance 510 with a stated amount of capacity (20,000 Mbps) that the seller provisions for others to purchase. The capacity allocation table also identifies puts (represented by the boxes above the service instance 510) and takes (represented by the boxes below the service instance 510) that modify the available amount of capacity for the service instance 510 over a period of time, where the period of time is represented by the horizontal length of the box representing the service instance 510.

As shown, the seller initially provisions 20,000 Mbps of capacity for the service instance 510. Take 520 represents that a buyer has executed a capacity agreement to purchase 5,000 Mbps for the duration that is represented by the horizontal length of the take 520. Put 530 represents the seller executing a capacity agreement to add an additional 200 Mbps of capacity to the service instance for the duration that is represented by the horizontal length of the put 530. Another take 540 is then executed to purchase another 1,000 Mbps of capacity from the service instance 510. Take 520 and take 540 may be executed by the same buyer or different buyers. In this manner, a service instance and its associated capacity can be sold off in different sized amounts of capacity for different lengths of time. Lastly, put 550 represents an additional 100 Mbps of capacity being added to the service instance 510 for the duration that is represented by the horizontal length of the put 550.

The box 560 may be representative of a query (or capacity request described below) that is submitted by a buyer, whereby the query specifies a duration and/or an amount of desired capacity. Since the capacity of the service instance changes based on the puts and takes, the buyer is presented with different values to indicate the availability of capacity for the service instance 510 during the indicated time period of box 560. As shown, the buyer is presented with the minimum, average, and maximum amounts of available capacity during the indicated time period of box 560. The minimum amount of available capacity during the indicated time period is 14,000 Mbps (20,000-5,000-1,000), the average amount of available capacity during the indicated time period is 15,625 Mbps, and the maximum amount of available capacity during the indicated time period is 20,000 Mbps. The buyer then has the option to submit a purchase offer for some or all of the available capacity of the service instance 510. It should be noted that the buyer's ability to purchase capacity from multiple different service instances allows the buyer to obtain a virtually unlimited amount of capacity and thereby dynamically scale its operations as needed without infrastructure or capacity restrictions.

In some embodiments, a search that is submitted by a potential capacity buyer can be saved to the exchange as a capacity request. This may occur when the service instances that have been published to the capacity exchange do not meet the qualifications that are specified by the buyer in the capacity request. Alternatively, a capacity request may be submitted to facilitate a reverse bidding process, whereby capacity sellers bid against one another to provide capacity for the capacity request. In some embodiments, the capacity exchange maintains a queue of capacity requests that are specified by different potential buyers of capacity. Capacity sellers can search the queue to identify capacity requests that they can fulfill according to qualifications specified by the capacity buyers as part of the capacity requests (e.g., desired amount of capacity, duration, geographic location, etc.). The capacity sellers can then make an offer to provide capacity to satisfy the capacity requests of a buyer. Accordingly, the capacity request allows for instantaneous or deferred capacity transactions, and for other commercial arrangements such as reverse bidding by a capacity seller.

Figure 6:
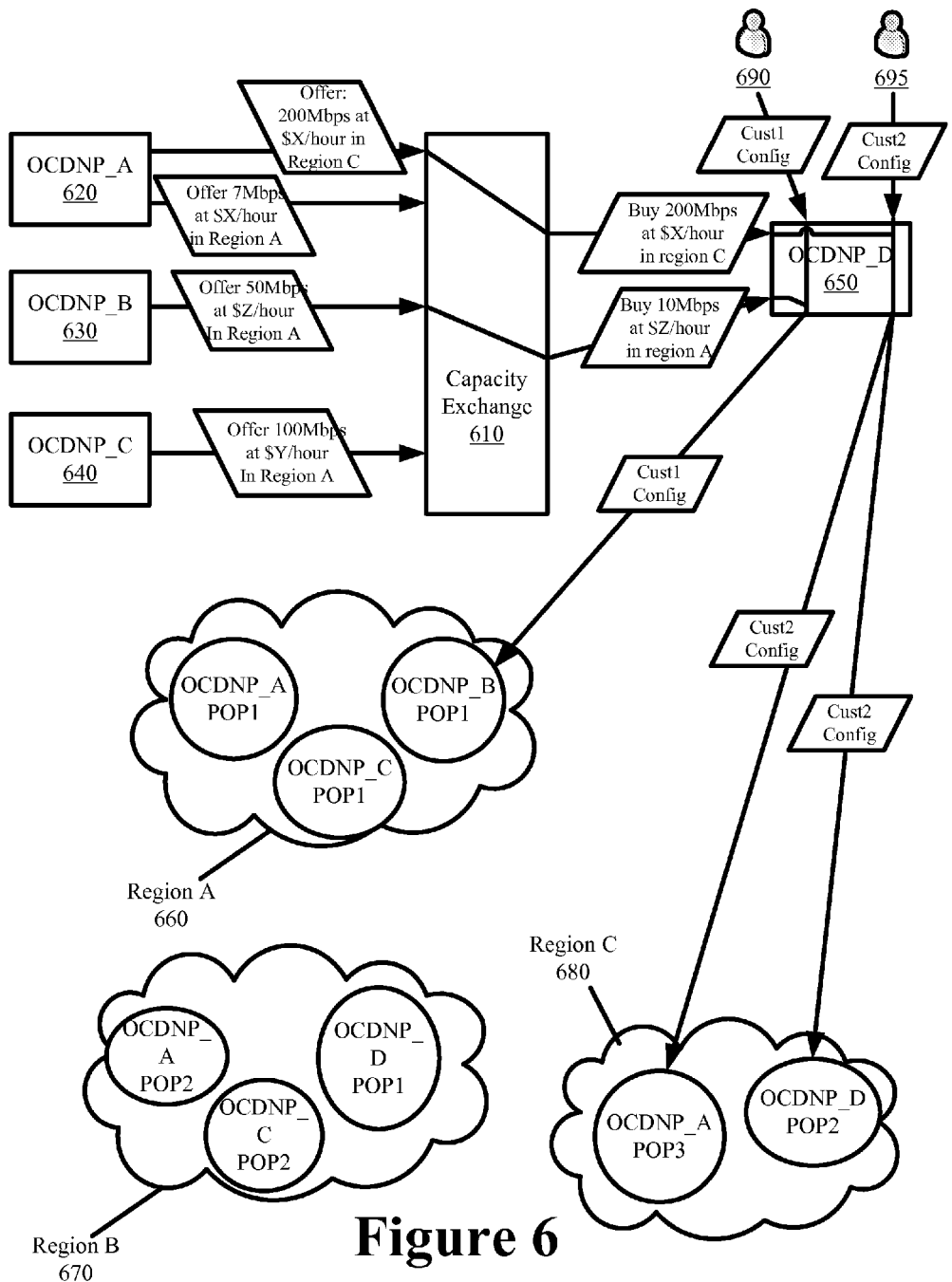
FIG. 6 conceptually illustrates the capacity exchange of the Open CDN platform brokering the exchange of capacity in accordance with some embodiments.

FIG. 6 conceptually illustrates the capacity exchange of the Open CDN platform brokering the exchange of capacity in accordance with some embodiments. The figure includes the capacity exchange 610, OCDNPs 620, 630, and 640 that participate in the capacity exchange 610 as service instance sellers, OCDNP 650 that participates in the capacity exchange 610 as a service instance buyer, POPs of the OCDNPs distributed across geographic regions, 660, 670, and 680, and customers 690 and 695 of OCDNP 650.

As shown, OCDNP 620 (i.e., OCDNP_A) has located at least one edge server in the geographic regions 660, 670, and 680 in order to establish a POP within each such geographic region; OCDNP 630 (i.e., OCDNP_B) has located at least one edge server in the geographic region 660 in order to a establish a POP within the geographic region 660; OCDNP 640 (i.e., OCDNP_C) has located at least one edge server in the geographic regions 660 and 670 in order to establish a POP within each such geographic region; and OCDNP 650 has located at least one edge server in the geographic regions 670 and 680 in order to establish a POP within each such geographic region.

OCDNPs 620, 630, and 640 publish service instances for their unused capacity in the geographic region 660 to the capacity exchange 610 along with geographic and cost service attributes related to the capacity being offered. Moreover, OCDNP 620 publishes a service instance for its unused capacity in geographic region 680 to the capacity exchange 610 along with geographic and cost service attributes related to the capacity being offered.

Next, OCDNP 650 searches the capacity exchange 610 to acquire additional capacity for its POP in the geographic region 680 and also to acquire capacity in the geographic region 660 where OCDNP 650 currently does not have a POP. As part of the search, OCDNP 650 specifies desired service attributes for the capacity it is looking to obtain. For example, these desired service attributes specify the amount of capacity desired, the geographic region where the capacity is desired, and the price OCDNP 650 is willing to pay for such capacity. The capacity exchange 610 then brokers the exchange of capacity by aligning the buyer (i.e., OCDNP 650) with the appropriate seller. Specifically, the capacity exchange 610 aligns the available service instance of whichever seller best matches the desired service attributes of the buyer. As shown, OCDNP 650 acquires all of OCDNP's 620 available capacity in the geographic region 680 while acquiring a fraction of OCDNP's 630 available capacity in the geographic region 660.

After acquiring the capacity, OCDNP 650 can configure the corresponding POPs of OCDNP 620 in the geographic region 680 and OCDNP 630 in the geographic region 660 to deliver content on behalf OCDNP 650 or more specifically, on behalf of customers 690 and 695 of OCDNP 650. As shown, the configuration for customer 690 of OCDNP 650 is deployed to the POP of OCDNP 630 in the geographic region 660 and the configuration for customer 695 of OCDNP 650 is deployed across the POPs of OCDNP 620 and OCDNP 650 in the geographic region 680.

As a result of the exchanged capacity in FIG. 6, OCDNP 620 fully avoids the sunk cost that is associated with having unused capacity in the geographic region 680, OCDNP 630 partially avoids the sunk cost that is associated with having unused capacity in the geographic region 660, OCDNP 650 is able to expand its capacity within the geographic region 680, and OCDNP 650 is able to establish an entirely new POP in the geographic region 660. Moreover, OCDNP 680 is able to obtain these advantages without the overhead of purchasing, configuring, and maintaining additional infrastructure in the geographic regions 660 and 680.

Figure 7:
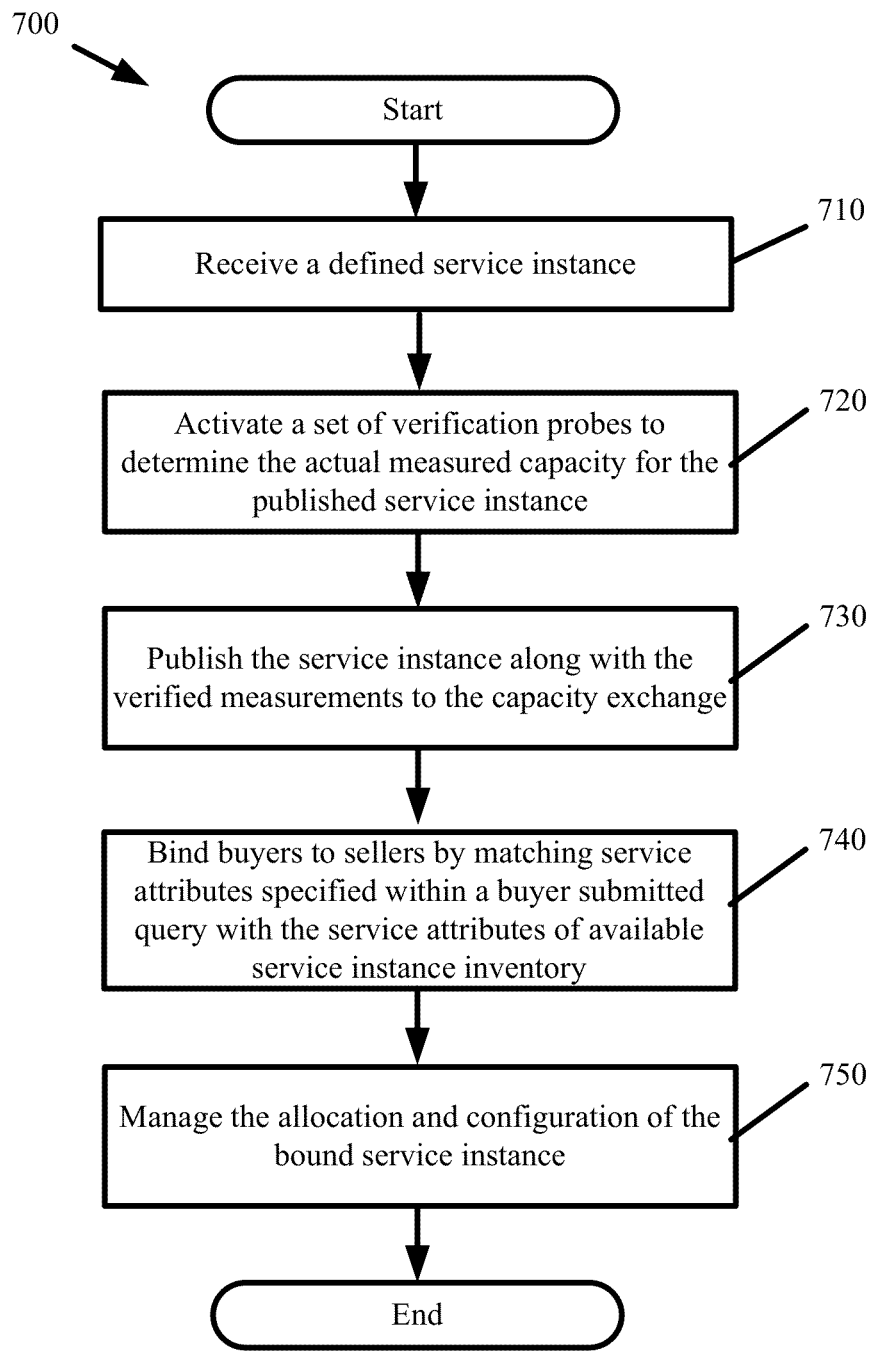
FIG. 7 presents a process performed by the capacity exchange of the Open CDN platform to facilitate the brokering of CDN capacity in accordance with some embodiments.

FIG. 7 presents a process 700 performed by the capacity exchange of the Open CDN platform to facilitate the brokering of CDN capacity in accordance with some embodiments. The process 700 commences when at least one participating OCDNP defines a service instance that is received (at 710) by the capacity exchange. The process activates (at 720) a set of verification probes to determine the actual measured capacity for the received service instance. The process publishes (at 730) the service instance along with the verified measurements to the capacity exchange where it becomes available for other OCDNPs to purchase. The process brokers the exchange of the service instance by matching (at 740) buyers to sellers. The process facilitates the matching of buyers to sellers by matching qualifications specified with a buyer submitted query with the service attributes of available service instance inventory. This matching may include matching one buyer to one seller or matching one buyer to many sellers. When one buyer is matched to one seller, the buyer can purchase some or all of the capacity in a service instance that is offered by that seller. When one buyer is matched to many sellers, the buyer can purchase some or all of the capacity from different service instances that are offered by different sellers. Once the exchange of capacity is complete, the process manages (at 750) the allocation and configuration of that capacity as described in Section II below.

II. Capacity Allocation and Management

In some embodiments, the Open CDN platform manages the allocation and configuration of a service instance that was successfully sold or auctioned through the capacity exchange. This involves mapping a customer configuration from a first OCDNP to a second OCDNP and setting traffic management services so that requests are optimally routed between the first OCDNP and the second OCDNP in a seamless manner. Configuration mapping is complicated by virtue of the fact that each OCDNP is independently operated. This results in each OCDNP having proprietary or customized infrastructure and software that may be incompatible with the infrastructure and software of another OCDNP.

To overcome these obstacles, the Open CDN platform provides a connector agent and an application programming interface (API) to facilitate intercommunication between the OCDNPs and between each OCDNP and the Open CDN platform. Intercommunication involves (1) the passing and deployment of a customer configuration between two or more OCDNPs, (2) the passing and execution of operational commands between two or more OCDNPs, and (3) the passing and reporting of statistical data between two or more OCDNPs. The description for the passing and reporting of statistical data is provided in Section III below.

In some embodiments, intercommunication within the Open CDN platform requires the ability to uniquely identify each OCDNP participant and each customer of each OCDNP participant. This is in addition to uniquely identifying the service instances as was described above. The unique identifiers provide mechanisms with which to deploy and monitor customer configurations across the Open CDN platform and the participating OCDNPs. In some embodiments, the Open CDN platform assigns an identifier to uniquely identify each OCDNP participating in the Open CDN platform. This unique identifier is referred to as the service provider identifier or OCDN_SPID. In some embodiments, the Open CDN platform assigns an identifier to uniquely identify each customer of each OCDNP. This unique identifier is referred to as the customer identifier or OCDN_CID. In some embodiments, the identifiers are assigned to an OCDNP when the OCDNP registers with the Open CDN platform, though the identifiers may be dynamically assigned as needed.

In some embodiments, the OCDN_SPID is a multi-digit hexadecimal value that is uniquely assigned to each OCDNP. This identifier can be used to conceal the identity of the OCDNP in the Open CDN platform and to prevent other OCDNPs from obtaining insight as to the operations of the OCDNP. For instance, the OCDN_SPIDs hide which OCDNPs are in need of capacity and which OCDNPs have excess capacity. In some embodiments, the OCDN_SPIDs are assigned by an identifier assignment engine that is a component of the Open CDN platform.

In some embodiments, the OCDN_CID is a multi-digit hexadecimal value that is uniquely assigned to each customer of each OCDNP. Specifically, the OCDN_CID is assigned to each customer that has its configuration partially or wholly deployed to a foreign OCDNP. In some embodiments, the OCDN_CID is comprised of other identifiers. For example, the OCDN_CID may be formatted as SPID:CID, wherein the SPID is the OCDN_SPID assigned to each OCDNP and the CID is a native customer identifier used by the OCDNP. Alternatively, the OCDN_CID may be formatted as a sixteen digit hexadecimal value formatted as SPID:WID:PID:CID, wherein the WID is a wholesaler identifier and the PID is a partner identifier which are also native identifiers of the OCDNP. These additional identifiers provide greater flexibility in the identification and tracking of customers within the Open CDN platform. The OCDN_CID is used when configuring a configuration across multiple OCDNPs, modifying a configuration spanning multiple OCDNPs, issuing commands for configurations spanning multiple OCDNPs, and monitoring the performance of a configuration across multiple OCDNPs. By using a combination of the SPID and CID to form the OCDN_CID, the system can assure that configurations will not "collide" when propagated among the participating OCDNPs. Since each OCDNP operates autonomously and shares information with the Open CDN platform when using purchased capacity, it is a foundational principle that the namespace of each CDN is independently managed and that one of the roles of the Open CDN connector agent and API is to prevent collisions across namespaces by providing a globally unique identifier for elements that are shared throughout the Open CDN platform and amongst participating OCDNPs. The identifiers explicitly identified for preferred embodiments are the service instance identifiers and customer identifiers described above.

The connector agent is an active process that is integrated with each participating OCDNP on the administrative server or other component of the OCDNP. Alternatively, the connector agent may be a separate component with communicative access to various components of the OCDNP. The connector agent may be implemented as a set of software modules or as specialized hardware. The connector agent serves as the interface with which the OCDNP communicably couples to the Open CDN platform and more specifically, communicably couples with other OCDNPs for inter-CDN communication. As will be described in greater detail below, the connector agent is the interface for sending and receiving configurations, commands, and statistical data for inter-CDN deployed configurations.

The Open CDN API defines translations (1) between native OCDNP identifiers and the Open CDN platform identifiers and (2) between native OCDNP configuration formats and an Open CDN configuration format. The connector agent utilizes the translations defined in the Open CDN API to map between the different identifiers and configuration formats when intercommunication is necessary. The connector agent and the Open CDN API provide the means with which OCDNPs can participate in the Open CDN platform without changing their native formats. In this manner, any OCDNP can seamlessly participate in the Open CDN platform while continuing to operate as a standalone OCDNP.

Each OCDNP discloses its native identifiers and native configuration formats to the Open CDN platform so that translations may be defined for those identifiers and formats in the Open CDN API. In some embodiments, an OCDNP discloses the native identifiers and the native formats when registering to participate in the Open CDN platform. An Open CDN platform administrator then defines the translations for converting between the different native identifiers and the different native configuration formats of the different OCDNPs. The translations are entered into the Open CDN API.

In some embodiments, an intermediary Open CDN configuration format is defined and used when converting between native configuration formats of two OCDNPs. The Open CDN configuration format specifies a set of minimal configuration parameters that each participating OCDNP supports. This is so the Open CDN platform can offer the same functionality on different CDNs. Some such settings include settings for allocating and configuring a service instance, invoking global commands such as load and purge, and retrieving statistics.

In some embodiments, the intermediary Open CDN configuration format facilitates intercommunication when the Open CDN platform is implemented as a distributed framework. In some such embodiments, a connector agent and Open CDN API are integrated with each OCDNP. However, each Open CDN API may be defined with a different set of translations. Specifically, each Open CDN API is defined with translations for translating between the native format of the OCDNP that it is integrated with and the Open CDN format. It is anticipated that a connector agent and Open CDN API will be required for each participating CDN technology platform provided by various service providers who desire to allow their technology/platform to participate in the Open CDN platform.

Figure 8:
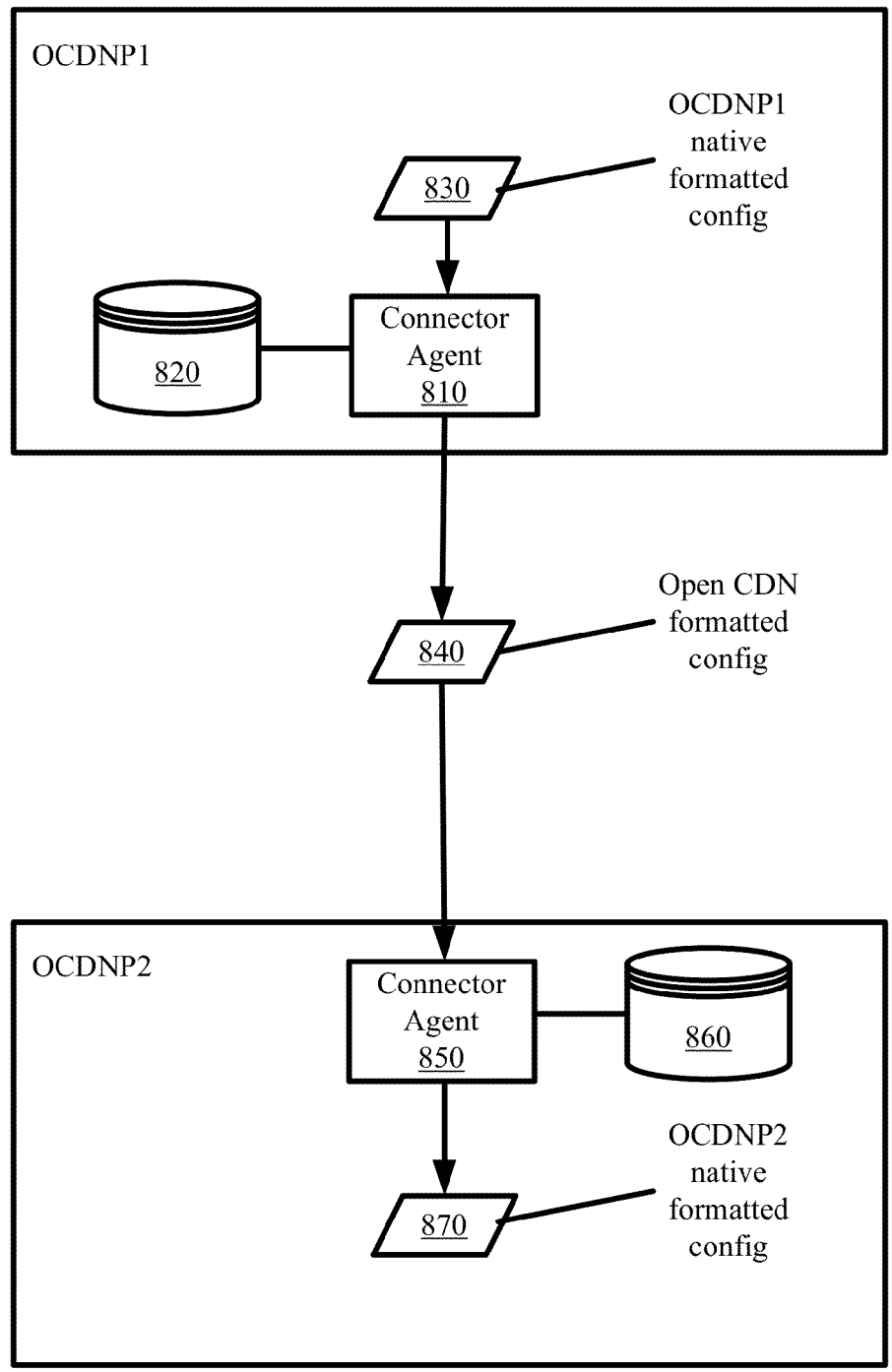
FIG. 8 conceptually illustrates passing a configuration from a first OCDNP to a second OCDNP when the Open CDN platform is implemented as a federated platform.

FIG. 8 conceptually illustrates passing a configuration from a first OCDNP to a second OCDNP when the Open CDN platform is implemented as a federated platform. In this figure, the connector agent of the first OCDNP 810 uses the Open CDN API of the first OCDNP 820 to map the configuration 830 from the native format of the first OCDNP to the Open CDN format 840. Though not shown, the mapping may include translating from a native customer identifier that is associated with the configuration 830 to the corresponding Open CDN customer identifier. Next, the connector agent of the first OCDNP 810 passes the Open CDN formatted configuration 840 to the connector agent of the second OCDNP 850. The connector agent of the second OCDNP 850 uses the Open CDN API of the second OCDNP 860 to map the configuration from the Open CDN format 840 to the native format of the second OCDNP 870. Though not shown, this mapping may also include translating from the Open CDN customer identifier to a native customer identifier used within the OCDNP. Once mapping to the native format is complete, the connector agent 850 forwards the configuration 870 for deployment to capacity of the second OCDNP. As part of the deployment, the second OCDNP configures the one or more edge servers that provide the capacity for the identified service instances according to the remapped configuration. Additionally, the second OCDNP configures its internal traffic management service so that requests for content associated with the configuration are routed to the most optimal edge server of the configured edge servers. This may include updating Domain Name System (DNS) tables with CNAMEs or IP addresses for the appropriate edge servers. It should be apparent that for purposes of simplifying the discussion the mappings for and passing of other identifiers were omitted from the discussion and the figure. Accordingly, it should further be apparent that the connector agents and Open CDN APIs may also perform mappings between native customer identifiers and pass service instance identifiers such that the foreign OCDNP can identify who the configuration belongs to and identify where the configuration is to be deployed.

In some embodiments, the two stage mapping of FIG. 8 is replaced with a direct mapping that translates from the native configuration format of a first OCDNP to the native configuration format of any other OCDNP. In some such embodiments, the Open CDN APIs at each OCDNP are modified to include translations for converting between native identifiers and configuration formats to foreign identifiers and configuration formats of any other OCDNP. Accordingly, when passing a native configuration from a first OCDNP to a second OCDNP, the connector agent utilizes the Open CDN API at the first OCDNP to directly map from the native identifiers and configuration formats of the first OCDNP to the native identifiers and configuration formats of the second OCDNP. In some other embodiments, the Open CDN API is centrally managed by the Open CDN platform and each OCDNP is enhanced with a connector agent that utilizes that centralized Open CDN API for configuration mapping and other intercommunication.

Figure 9:
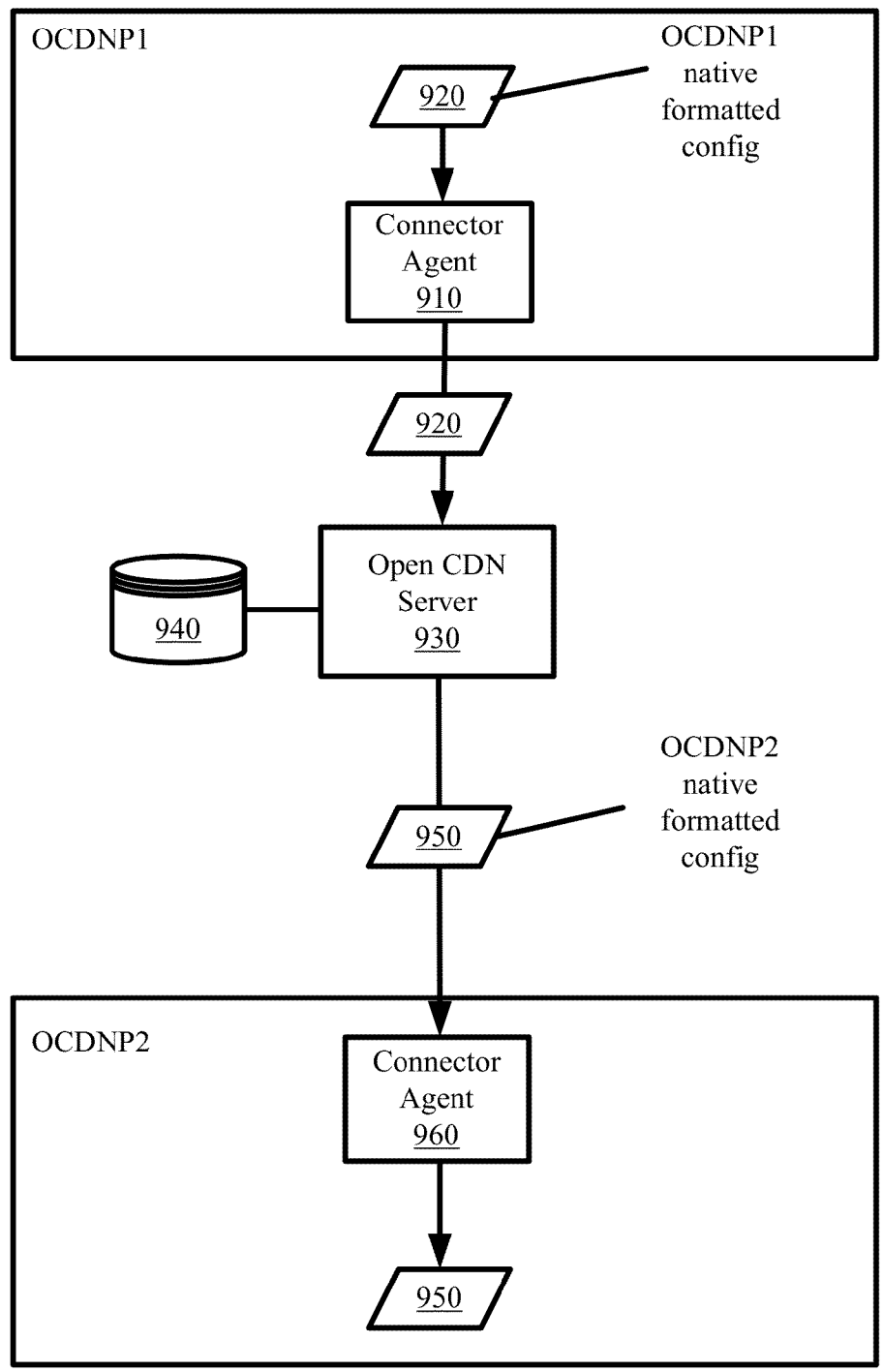
FIG. 9 conceptually illustrates passing a configuration from a first OCDNP to a second OCDNP when the Open CDN platform is implemented with a centrally managed Open CDN API.

FIG. 9 conceptually illustrates passing a configuration from a first OCDNP to a second OCDNP when the Open CDN platform is implemented with a centrally managed Open CDN API. In this figure, the connector agent of the first OCDNP 910 passes the configuration 920 in the native format of the first OCDNP to Open CDN server 930 that includes the centrally management Open CDN API 940 (the Open CDN server is described below in Section IV). The connector agent 910 also passes a destination address for the second OCDNP that is to receive the configuration and/or other identification information such as the service instance the configuration is to be deployed to at the second OCDNP (not shown in the figure). The Open CDN server 930 translates the configuration from the native format of the first OCDNP to the native format of the second OCDNP (as denoted by reference marker 950). This translation may be performed without use of the intermediary Open CDN format. The Open CDN server 930 then passes the reformatted configuration 950 to the connector agent of the second OCDNP 960 at which point the configuration 950 can be deployed to capacity of the second OCDNP.

In some embodiments, each OCDNP may configure its infrastructure according to an agreed upon set of identifiers and formats. This may include reconfiguring the resources of the OCDNPs with a common set of APIs provided by a particular OCDNP or provided by an administrator of the Open CDN platform. For example, all OCDNPs agree to deploy APIs of the EdgeCast CDN across their native infrastructures to facilitate CDN operation, even though branding and control is independently retained by each OCDNP. In such instances, translation mapping is not necessary and configurations can be shared across different OCDNPs without modification.

In some embodiments, the Open CDN platform provides a global traffic management service to supplement the existing traffic management services of each of the OCDNPs. The global traffic management service performs a first level routing decision for requests directed to configurations that have been deployed across two or more OCDNPs. The first level routing decision involves forwarding the content request to the traffic management service of the OCDNP that can optimally respond to the request. Once forwarded, the traffic management service for the selected OCDNP takes over and selects an edge server of the OCDNP to optimally service the request. In some embodiments, the first level routing decision is based on monitored load, performance, and capacity of the OCDNPs to which a configuration has been deployed. Accordingly, the Open CDN platform continually probes the OCDNPs to derive measurements for the load, performance, and capacity available at each OCDNP.

It should be apparent that many different traffic management schemes may be applied in the Open CDN platform. In one such alternative traffic management scheme, the first level routing decision can be based on direct monitoring of the edge servers. In some such embodiments, the Open CDN platform continually probes the edge servers that are associated with the service instances sold through the capacity exchange and the Open CDN platform maintains a list of inter-OCDNP content that is hosted by these servers such that a direct routing decision can be made by the global traffic management service.

Figure 10:
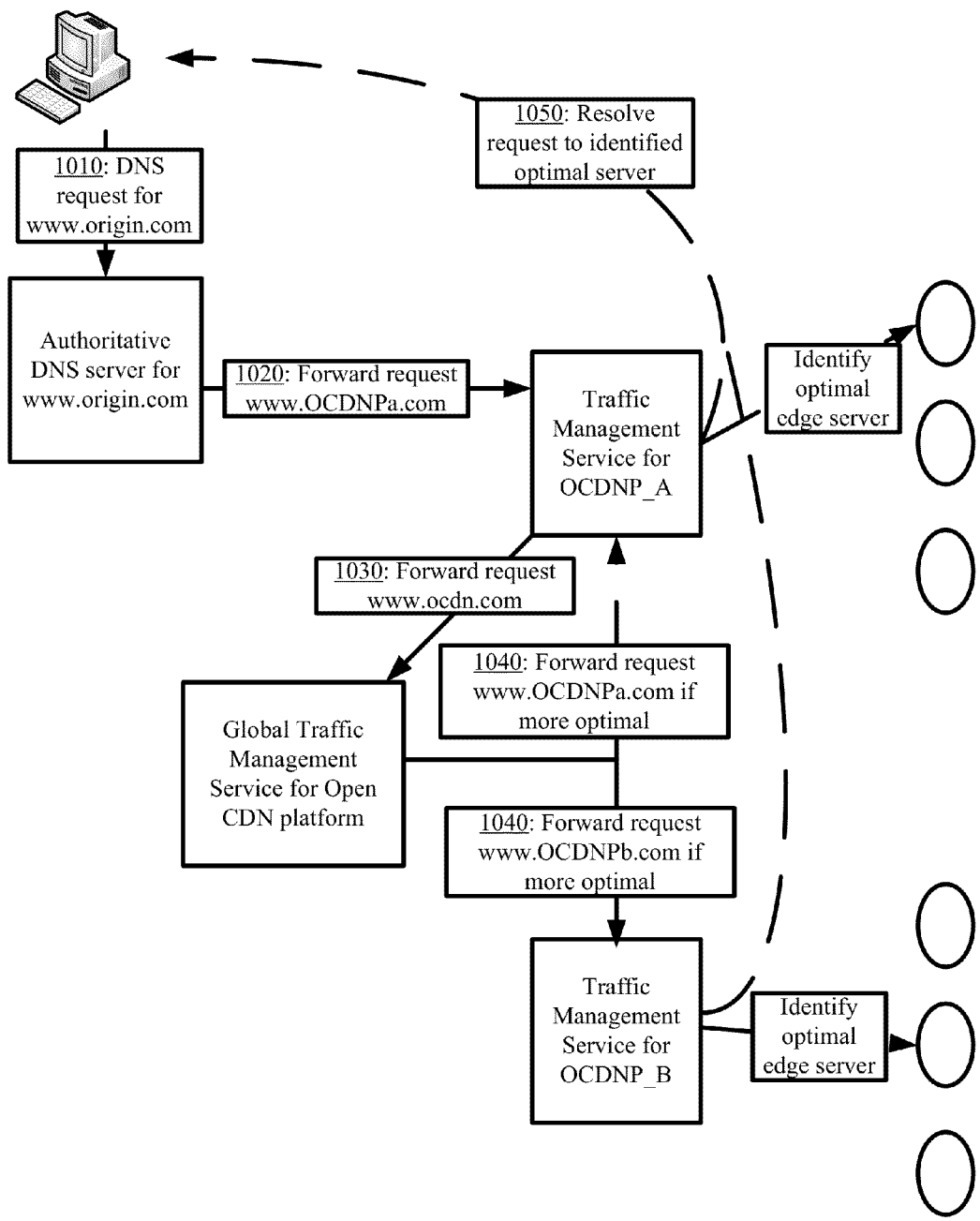
FIG. 10 illustrates the global traffic management service of the Open CDN platform in accordance with some embodiments.

FIG. 10 illustrates the global traffic management service of the Open CDN platform in accordance with some embodiments. The process begins (at 1010) when a content consumer submits a request for content. Such a request is usually in the form of a DNS request though other request formats can be supported by the Open CDN platform. The request may initially be directed (at 1010) to the domain of the content originator (e.g., www.origin.com) or to the domain of OCDNP_A that the content originator has contracted with to deliver content on its behalf (www.ocdnpa.com). When the request is directed to the domain of the content originator, the traffic management services of the content originator (i.e., the authoritative DNS server for the content originator domain) will forward (at 1020) the request to the traffic management services of OCDNP_A (i.e., the authoritative DNS server for the OCDNP_A domain). Typically, the request is forwarded by use of a CNAME entry in the authoritative DNS server of the content originator, wherein the CNAME points to the OCDNP_A domain.

When the request is for content of a customer whose configuration is wholly hosted by the OCDNP_A, the OCDNP_A traffic management service will resolve the request and identify the IP address or virtual IP address of the edge server or edge server load balancer that optimally serves the requested content from within the OCDNP_A. However, when the request is for content of the customer whose configuration is deployed to OCDNP_A and at least one foreign OCDNP, the OCDNP_A traffic management service will forward (at 1030) the request to the Open CDN global traffic management service (i.e., the authoritative DNS server for the Open CDN platform). This requires a configuration change that each OCDNP makes to their native traffic management service whenever a customer's configuration is deployed to a service instance of a foreign OCDNP. The configuration change may include using a CNAME entry to redirect the request to the Open CDN global traffic management service. Alternatively, the configuration change may include recursively resolving the request so that the request is resent to the Open CDN global traffic management service.

The Open CDN global traffic management service maintains a table for what content or what customer configurations are deployed across which OCDNPs. The Open CDN global traffic management service also maintains performance parameters for each of the OCDNPs such as geographic location, load, latency, bandwidth, etc. In some embodiments, the performance parameters are obtained directly from probes of each of the OCDNPs or from the traffic management service (e.g., the DNS servers) of each of the OCDNPs. Additionally or alternatively, the Open CDN platform may activate its own set of probes to acquire the performance parameters as needed or on a periodic basis. From these performance parameters, the Open CDN global traffic management service identifies which of the OCDNPs hosting the requested content can optimally serve the requested content to the content consumer. This decision can be based on the geographic proximity of the service instance hosting the content to the requestor or other parameters including load, performance, or capacity. Alternatively, this decision can be made generally based on the geographic proximity of the OCDNP or load, performance, or capacity parameters of the OCDNPs. The Open CDN global traffic management service then forwards (at 1040) the request to the traffic management service of the optimal OCDNP where the request is resolved (at 1050) to the edge server that optimally serves the content to the content consumer.

In this manner, the Open CDN global traffic management service seamlessly routes content requests to an optimal edge server irrespective of whether the optimal edge server is operated by a native OCDNP or a foreign OCDNP. The Open CDN global traffic management service performs the routing by leveraging existing traffic management services of each OCDNP. Moreover, traffic management services of the OCDNPs are only minimally modified to support the global traffic management service function. Specifically, the OCDNP traffic management service first checks whether an incoming request is for content that is hosted wholly within the native OCDNP or is for content that is hosted using at least one foreign OCDNP. If the request is for content that is wholly hosted within the native OCDNP, the traffic management service resolves the request as it would if operating independent of the Open CDN platform. If the request is for content that is hosted by at least two OCDNPs, then the request is forwarded to the Open CDN global traffic management service where a decision is made as to which OCDNP can optimally serve the request. It should be apparent that the global traffic management service can supplement any existing OCDNP traffic management service such as a single-tier or multi-tier DNS resolution service or an Anycast resolution service.

To further support seamless scaling of OCDNP capacity, the Open CDN platform seamlessly propagates global commands across the participating OCDNP. For example, a customer may issue a global load command for all edge servers deployed with the configuration to preload certain content to cache. Alternatively, the customer may issue a global purge command for all edge servers deployed with the configuration to remove all instances of a particular object from cache. When the configuration is deployed using capacity of a single OCDNP, the global commands are issued within the OCDNP as normal. However, when a configuration is deployed using capacity of at least two OCDNPs, the Open CDN API performs the command propagation and translation that is necessary to globally issue the command across the OCDNPs.

Figure 11:
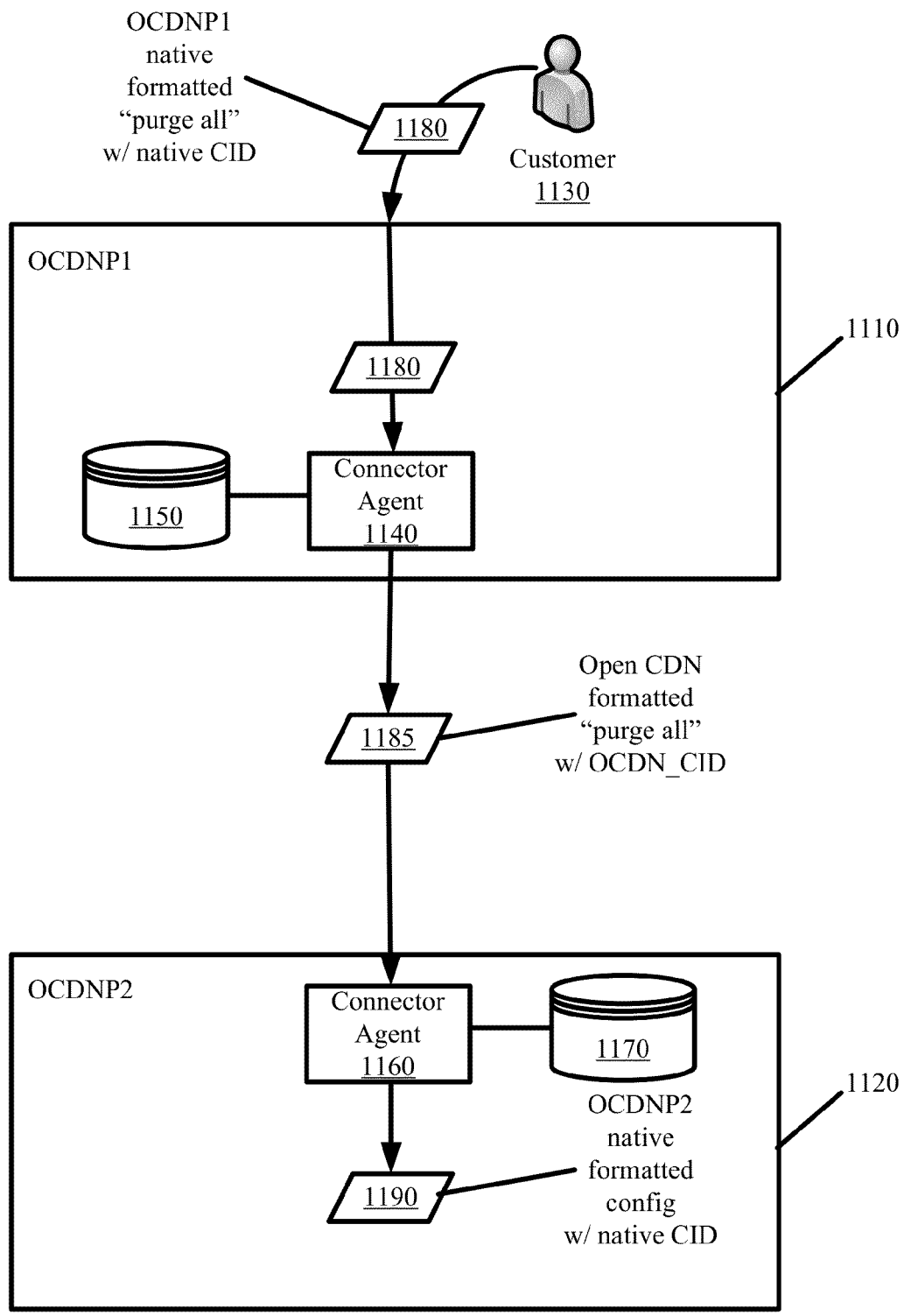
FIG. 11 conceptually illustrates intercommunicating global commands across different OCDNPs when the Open CDN platform is implemented with a distributed set of Open CDN APIs.

FIG. 11 conceptually illustrates intercommunicating global commands across different OCDNPs when the Open CDN platform is implemented with a distributed set of Open CDN APIs. The process of intercommunicating commands is similar to the process of configuration reformatting described with reference to FIG. 8 above. This figure presents OCDNP 1110 and OCDNP 1120 that participate in the Open CDN platform and customer 1130 of OCDNP 1110. OCDNP 1110 is enhanced with connector agent 1140 and Open CDN API 1150 and OCDNP 1120 is enhanced with connector agent 1160 and Open CDN API 1170. It is assumed in this figure that the configuration for the customer 1130 has been deployed to capacity of OCDNP 1110 and OCDNP 1120.

The customer 1130 utilizes an interface of the OCDNP 1110 to submit a "purge all" command 1180. This interface would be the same interface of OCDNP 1110 that the customer 1130 would access when the OCDNP 1110 operates independent of the Open CDN platform. The OCDNP 1110 internally executes the command 1180 as it normally would operating independent of the Open CDN platform. However, the command 1180 also passes to the connector agent 1140 running on the OCDNP 1110.

The connector agent 1140 checks a first table of the Open CDN API 1150 to determine whether the configuration for the customer 1130 has been deployed to a foreign OCDNP. The first table identifies which customer configurations of OCDNP 1110 have been deployed to which foreign OCDNPs. In this figure, the first table identifies that the configuration for customer 1130 has been deployed to OCDNP 1120.

Upon identifying that the configuration has been deployed to a foreign OCDNP, the connector agent 1140 accesses a second table of the Open CDN API 1150 that translates between native command formats of OCDNP 1110 to Open CDN command formats. The connector agent 1140 then uses the second table to map the "purge all" command from the OCDNP 1110 native format to the equivalent "purge all" command in the Open CDN format.

The connector agent 1140 then utilizes a third table of the Open CDN API 1150 to map the native identifier for customer 1130 to the corresponding Open CDN platform customer identifier (i.e., OCDN_CID). The Open CDN formatted command with the OCDN_CID 1185 is then passed to the connector agent 1160 of OCDNP 1120.

The connector agent 1160 performs a reverse mapping using the Open CDN API 1170 of OCDNP 1120 to 1) map the Open CDN formatted command to a native OCDNP 1120 command and 2) map the OCDN_CID to a native customer identifier. The connector agent 1160 then issues the native formatted command with the native customer identifier 1190 to the appropriate resources (i.e., edge servers) for execution in OCDNP 1120. It should be apparent that in some embodiments, the service instance identifiers are passed along with the command.

Figure 12:
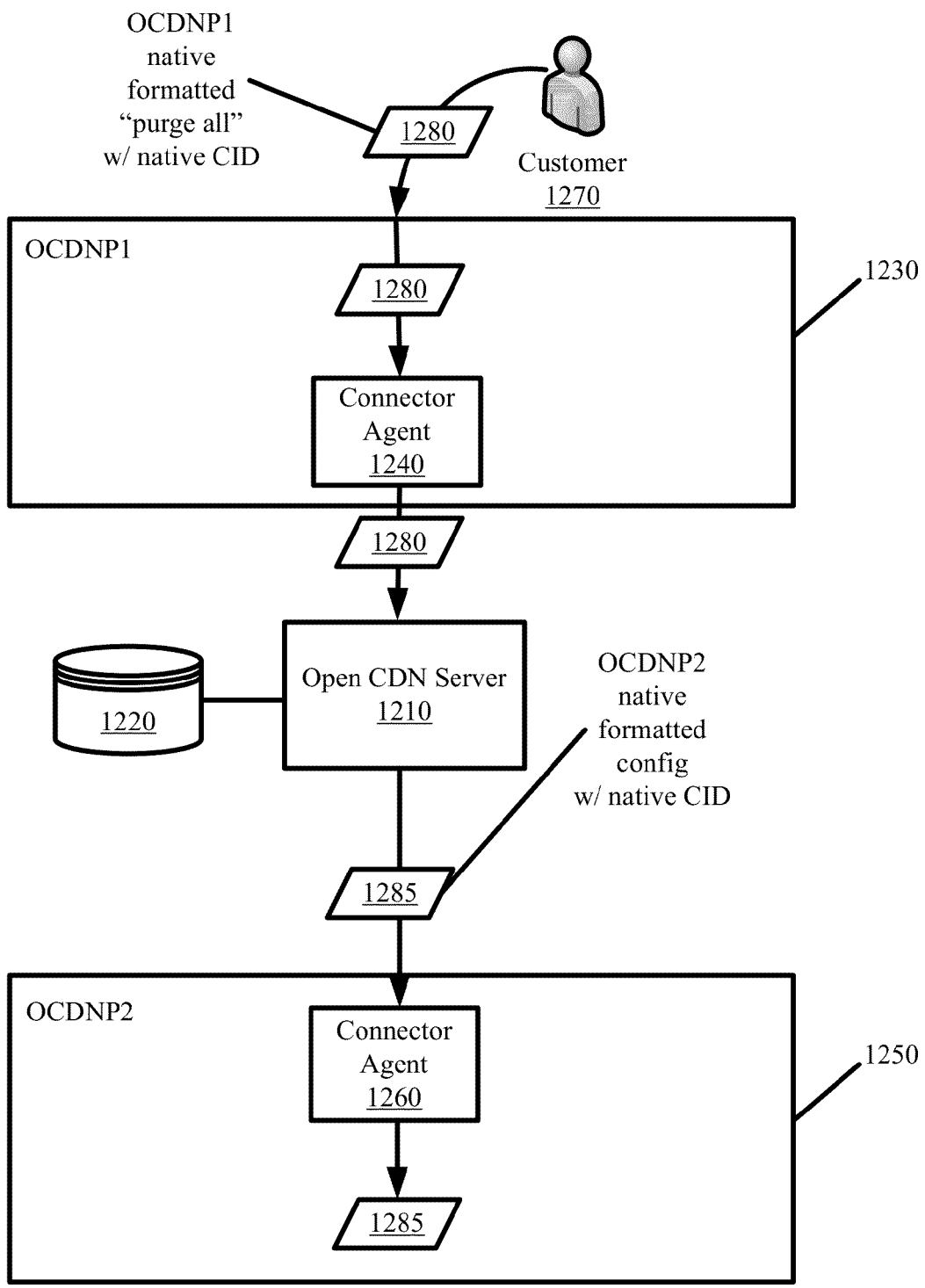
FIG. 12 conceptually illustrates intercommunicating global commands across different OCDNPs when the Open CDN platform is implemented with a centralized Open CDN API.

FIG. 12 conceptually illustrates intercommunicating global commands across different OCDNPs when the Open CDN platform is implemented with a centralized Open CDN API. This figure presents an Open CDN server 1210 with a centralized Open CDN API 1220, OCDNP 1230 enhanced with connector agent 1240, and OCDNP 1250 enhanced with connector agent 1260.

Customer 1270 utilizes an interface of the OCDNP 1230 to submit a "purge all" command 1280. As in FIG. 11, OCDNP 1230 internally executes the command 1280 as it normally would operating independent of the Open CDN platform and the command 1280 passes to the connector agent 1240.

In this figure, the connector agent 1240 maintains a table for configurations of OCDNP 1230 that have been exposed to a foreign OCDNP. It is assumed that the configuration of customer 1270 has been exposed to OCDNP 1250 such that the connector agent 1240 forwards the "purge all" command 1280 in the OCDNP 1230 native format to the Open CDN server 1210. The connector agent 1240 also forwards the customer identifier in the OCDNP 1230 native format to the Open CDN server 1210. In some embodiments, the connector agent 1240 also identifies OCDNP 1250 as the destination for the command though this information can also be obtained from the centralized Open CDN API 1220 based on the customer identifier. More specifically, the connector agent 1240 may identify the service instances of the OCDNP 1250 where the customer's configuration is located.

The Open CDN server 1210 utilizes the centralized Open CDN API 1220 to map the command from the OCDNP 1230 native format to the OCDNP 1250 native format and to map the customer identifier from the native format of CNDSP 1230 to the native format of OCDNP 1250. The reformatted command and identifier 1285 are then passed to the connector agent 1260 of OCDNP 1250 which then disseminates the command for execution within OCDNP 1250.

Based on the foregoing, it should be apparent that the Open CDN platform is a non-intrusive and seamless platform that allows each participating OCDNP to retain its own set of customers while continuing to provide CDN service directly to those customers. When additional capacity is needed, such capacity is purchased by the OCDNP and then seamlessly integrated to scale a customer configuration without the customer being aware that its configuration has been fully or partially deployed using capacity of another OCDNP. In fact, customers continue to utilize the interfaces or portals provided by the OCDNP to which they are a customer of in order to specify configurations, issue commands, or view statistics about the configuration. As a result, the Open CDN platform promotes OCDNP participation within the Open CDN platform by allowing OCDNPs to continue their day-to-day operations as normal, keep a majority of their infrastructure and operation private, and interact with the Open CDN platform only as necessary.

III. Reporting

In addition to the above described mappings, some embodiments perform additional or alternative mappings to produce normalized statistical data based on statistical data that is aggregated from different OCDNPs. This mapping is performed because the statistics from each OCDNP may be formatted differently or may contain different fields. Therefore, to ensure commonality in statistical reporting across the Open CDN platform, the connector agents in conjunction with or independent of the Open CDN APIs prune, clean, and standardize the statistics from the different OCDNPs to produce a uniform report for a customer that has a configuration deployed across multiple OCDNPs.

The uniform report provides a holistic view for the performance and utilization of the customer's configuration when the configuration is deployed across multiple OCDNPs. The report may also provide granular reporting for the performance of the customer's configuration on each deployed OCDNP and, further still, on each deployed edge server. Moreover, based on the aggregated statistical data, the Open CDN platform can produce a comprehensive usage report that can be used for billing or chargeback purposes for an OCDNP or OCDNP customer even when the configuration of the customer is deployed across different OCDNPs.

Figure 13:
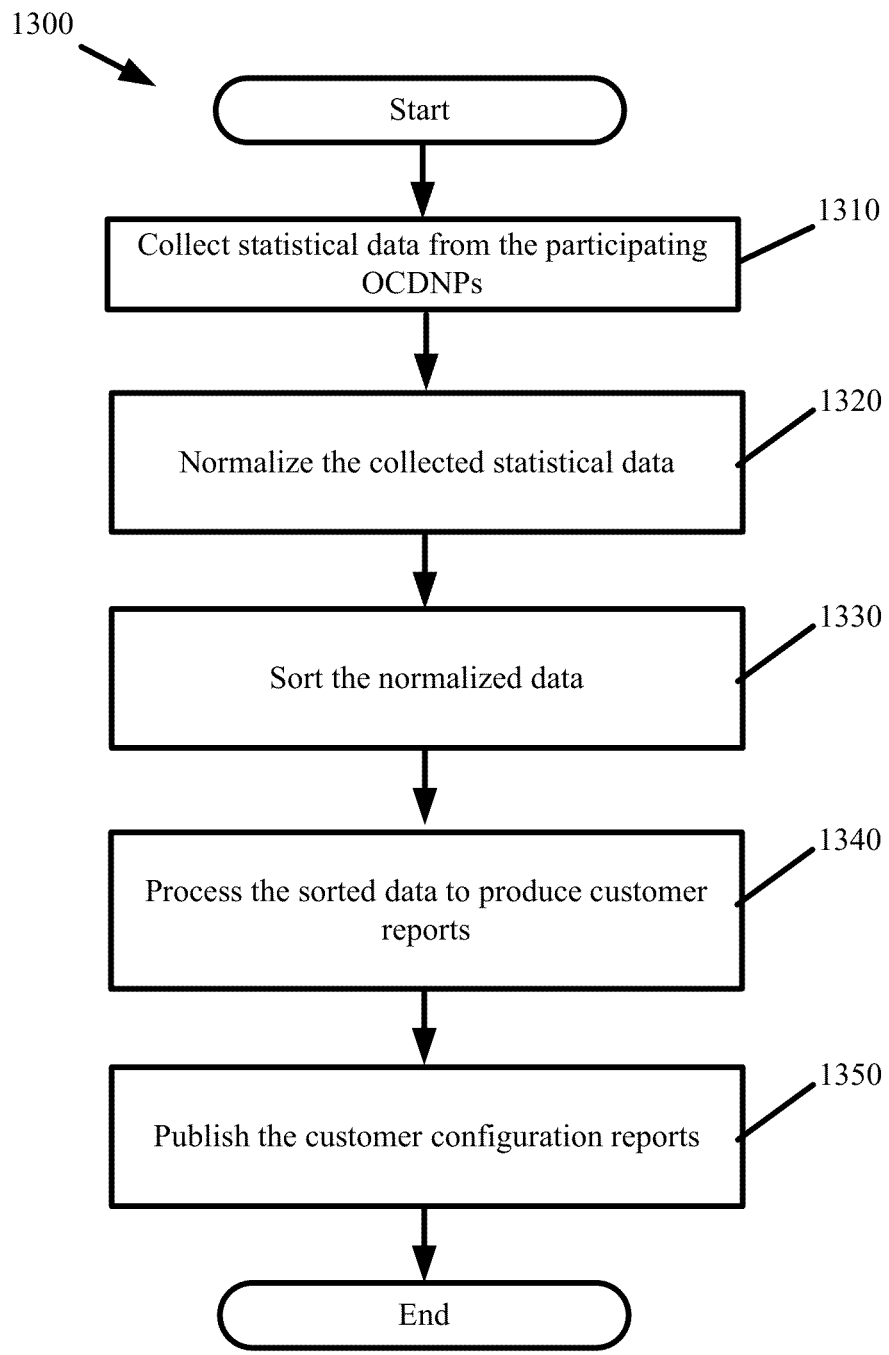
FIG. 13 presents a process for producing normalized statistical data within the Open CDN platform in accordance with some embodiments.

FIG. 13 presents a process 1300 for producing the normalized statistical data in the Open CDN platform in accordance with some embodiments. The process 1300 begins by collecting (at 1310) statistical data from each of the OCDNPs. The statistical data may include real-time data or detailed log data that is periodically recorded. The statistical data may report on various performance, load, and capacity parameters including throughput, bytes served, requests processed, overall traffic volume, hits/second, and stream and live feed information. Performing the data collection includes aggregating statistical data from the edge servers of the OCDNPs involved in inter-OCDNP deployed configurations. In some embodiments, the process 1300 is authorized to collect statistical data directly from the edge servers. In some embodiments, the process 1300 collects the statistical data from a data collection server or administrative server of each OCDNP. In some embodiments, the statistical data is collected on an individual customer basis wherein each unit of collected data is associated with an OCDN_CID or a native OCDNP customer identifier that can be converted to an OCDN_CID using the Open CDN API. In embodiments implemented using one of the centralized frameworks described in Section IV below, a central Open CDN server of the Open CDN platform performs the data collection. In embodiments implemented using one of the distributed frameworks described in Section IV below, the connector agents in conjunction with the Open CDN APIs at each OCDNP perform the data collection. In some such embodiments, the connector agent of each OCDNP performs its own statistical data collection process to collect statistical data from foreign OCDNPs to which native customer configurations have been deployed. The collected statistical data may be shared with the connector agents of other OCDNP participants or with the centralized Open CDN server.

The process normalizes (at 1320) the collected statistical data to convert from the native OCDNP data formats to the Open CDN data format. Normalization includes data pruning, data cleaning, and data standardization. In some embodiments, data pruning and data cleaning involves removing extraneous or proprietary reported parameters in order to derive a common set of statistical parameters for all OCDNPs. In some embodiments, data standardization involves converting the collected statistical data to the same timeframe, scale, and units as some examples.

The process sorts (at 1330) the normalized data for individual customer reporting. Specifically, when a customer configuration is deployed across different OCDNPs, different edge servers of the OCDNPs will produce statistical data for that customer configuration. During sorting, the process groups the statistical data for each Open CDN deployed customer configuration. This is accomplished by converting the native customer identifiers that are associated with the collected statistical data to the OCDN_CID and then grouping the statistical data that is associated with each particular OCDN_CID.

The sorted data is then processed (at 1340) to produce reports that contain a common set of performance and usage parameters. The processing may be performed centrally at the Open CDN server or in a distributed fashion using the connector agents and Open CDN APIs that are integrated with each OCDNP. In some embodiments, the processing includes running one or more heuristics to produce analytics based on the collected statistical data. In some embodiments, the heuristics amalgamate different metrics from the collected statistical data to produce abstracted performance or load values relative to a maximum serving capacity for a given unit of capacity of a server, POP, or service instance. The analytics can be reported with various granular levels of reporting. For example, a first level of granularity may identify the performance for the customer configuration across the Open CDN platform, a second level of granularity may identify the performance for the customer configuration on a per OCDNP basis, and a third level of granularity may identify the performance for the customer configuration on a per edge server basis. Other levels of granularity may include reporting on a per POP basis or on a per geographic region basis. Additionally, the metrics may be processed, grouped and stored in various degrees of time granularity, from real-time instantaneous snapshots, to trended historical data over hours, days, weeks or months. In some embodiments, the processing includes producing usage reports for billing or chargeback purposes for an OCDNP or OCDNP customer even when the configuration of the customer is deployed across different OCDNPs. From the usage reports, each OCDNP can determine how much traffic was carried by their CDN for foreign customers or for Open CDN capacity purchasers, each OCDNP can track the usage associated with a specific service instance that is sold through the Open CDN capacity exchange to another OCDNP, each OCDNP can audit or establish confidence in the usage numbers reported in the Open CDN platform (i.e., a native usage report is aligned with a usage report obtained from the Open CDN platform), and each native OCDNP can incorporate logs and usage data from foreign OCDNPs into their native usage reports to bill their native customers for all usage appropriately.

The process publishes (at 1350) each produced report. In some embodiments, publishing a report involves making the report accessible through an interface portal of the Open CDN platform (i.e., www.ocdn.com/reports). In some embodiments, publishing a report involves passing the report to the native OCDNP of a customer and the OCDNP then makes the report available to the customer through an existing portal of the OCDNP.

Some OCDNPs support the ability for customers to set one or more alerts that are triggered based on the occurrence of one or more conditions. In some embodiments, alerts can be set at the Open CDN server level. The Open CDN server monitors for the triggering of the alert based on the aggregated statistical data. When an alert is triggered, the alert is propagated from the Open CDN server to the appropriate OCDNP (via the connector agent) to notify the appropriate customer that set the alert.

IV. Framework

The Open CDN platform can be implemented with different architectural frameworks. In some embodiments, the Open CDN platform is implemented as a centralized framework whereby different OCDNPs are communicably coupled to a centralized Open CDN server. In some embodiments, the Open CDN platform is implemented as a distributed framework whereby each OCDNP intercommunicates with one another without a centralized Open CDN server facilitating the communications. Each OCDNP is enhanced with a connector agent for Open CDN and inter-OCDNP communication and depending on the Open CDN framework implementation, an Open CDN API may be integrated with each OCDNP or at the Open CDN server.

Figure 14:
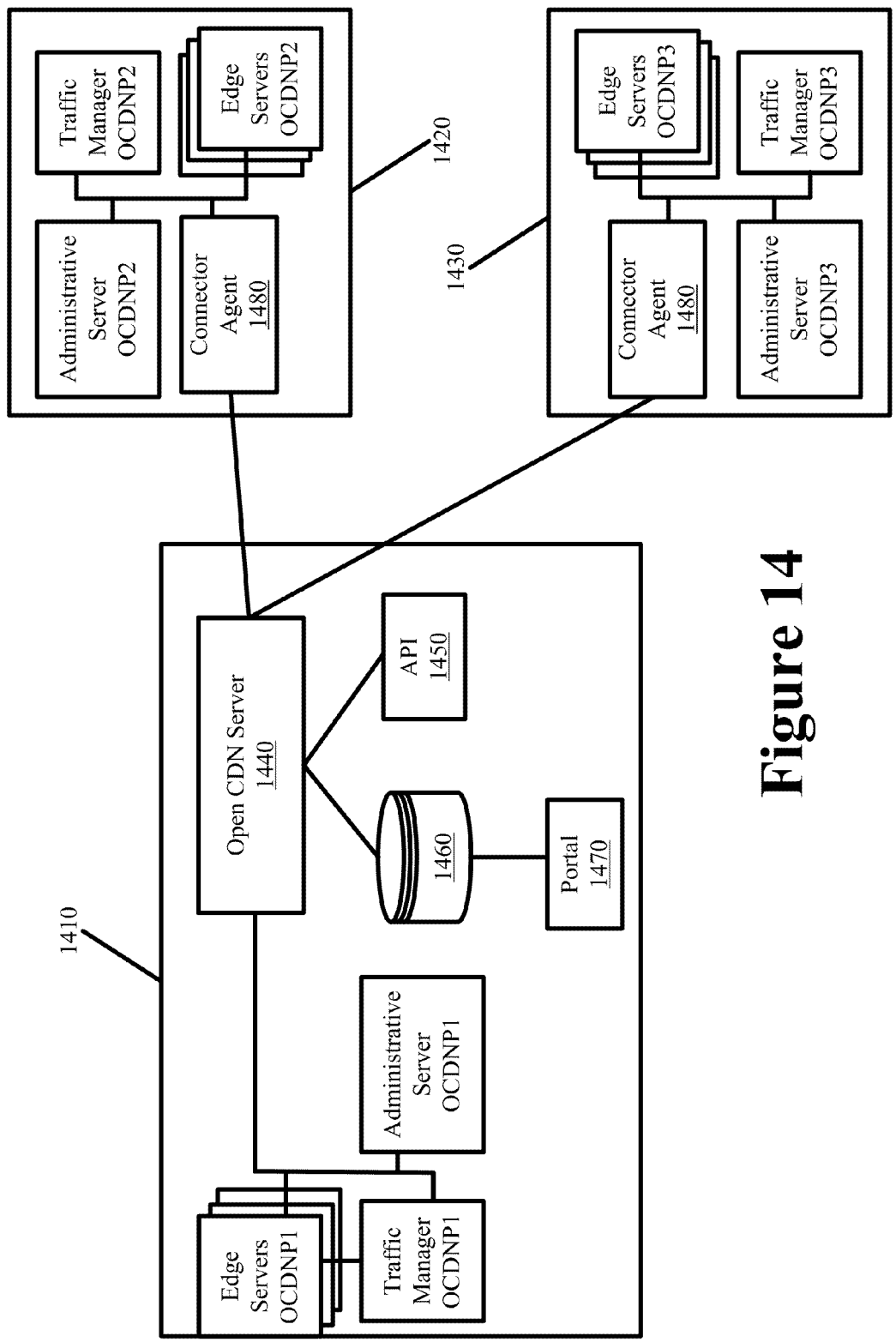
FIG. 14 illustrates a centralized framework for implementing the Open CDN platform in accordance with some embodiments.

FIG. 14 illustrates a centralized framework for implementing the Open CDN platform in accordance with some embodiments. In this centralized framework, one of several OCDNPs is designated to administer the Open CDN platform and the other OCDNPs communicably coupling to the designated OCDNP.

FIG. 14 illustrates OCDNPs 1410, 1420, and 1430. Each OCDNP 1410, 1420, and 1430 comprises at least a set of edge servers, a traffic management server, and an administrative server as described with reference to FIG. 1. It should be apparent that the OCDNPs 1410, 1420, and 1430 may be modified with other hardware and software. In this centralized framework, OCDNP 1410 is designated to administer the Open CDN platform and is enhanced with Open CDN server 1440, Open CDN API 1450, database 1460, and interface portal 1470. OCDNPs 1420 and 1430 become participants in the Open CDN platform with only minimal changes such as the inclusion of the connector agents 1480.

In some embodiments, the Open CDN server 1440 provides the capacity exchange that serves as the marketplace for the buying and selling of service instances. The Open CDN server 1440 performs the assignment of the Open CDN identifiers (e.g., OCDN_SIID, OCDN_SPID, and OCDN_CID). Additionally, the Open CDN server 1440 facilitates the allocation and configuration of service instances sold through the capacity exchange, the propagation of commands to the appropriate OCDNPs, and the collection and processing of statistical data from the OCDNPs. To do so, the Open CDN server 1440 utilizes the central Open CDN API 1450 to perform the necessary mappings that facilitate the various forms of intercommunications between OCDNP 1410 and the OCDNPs 1420 and 1430. Specifically, the Open CDN API 1450 includes the translations for mapping between the native identifiers, configurations, and statistical data of each of the OCDNPs 1410, 1420, and 1430.

The database 1460 tracks the publishing of service instances, the buying and selling of service instances, the deployment of customer configurations across OCDNPs, the assignment of identifiers, and the collected statistical data. In some embodiments, the OCDNPs 1420 and 1430 push statistical data to the Open CDN server 1440 for storage in the database 1460. In some embodiments, the Open CDN server 1440 pulls the statistical performance data from the OCDNPs 1420 and 1430 to store in the database 1460. The database 1460 is shown as a single database, however it should be apparent that the database 1460 may comprise one or more separate databases that run on one or more physical computing machines.

In some embodiments, the interface portal 1470 provides the interfaces for OCDNPs to register with the Open CDN platform, buy and sell service instances, and view the produced reports. The information provided by an OCDNP at the time of registration is stored to the database 1460. This registration information includes disclosure of the native identifiers, native configuration formats, native command formats, and native statistical formats that are needed to define the translations in the Open CDN API 1450. Such translations may be defined automatically using a set of scripts or manually by an Open CDN platform administrator.

The connector agents 1480 communicably couple the OCDNPs 1420 and 1430 to the Open CDN server 1440. In so doing, the connector agents 1480 enable the different forms of intercommunication within the Open CDN platform, two examples of which are illustrated in FIGS. 9 and 12 above. More specifically, the connector agents 1480 utilize common communication protocols and leverage the functionality of the Open CDN server 1440 and Open CDN API 1450 in order for the OCDNPs 1420 and 1430 to (1) publish their available capacity as a saleable service instance, (2) transact with the capacity exchange to receive configurations regarding the purchase of a service instance published by the OCDNP, (3) receive customer configurations from the Open CDN server 1440 for deployment to native capacity, (4) receive commands from the Open CDN server 1440 for execution using native resources, and (5) report statistical data to the Open CDN server 1440 for reporting purposes. It should be apparent that even though the connector agents 1480 are shown as separate functional components that run on separate specialized hardware within the OCDNPs 1420 and 1430, the connector agents 1480 may be modular software processes that integrate with existing components of the OCDNP, such as with the administrative server.

Figure 15:
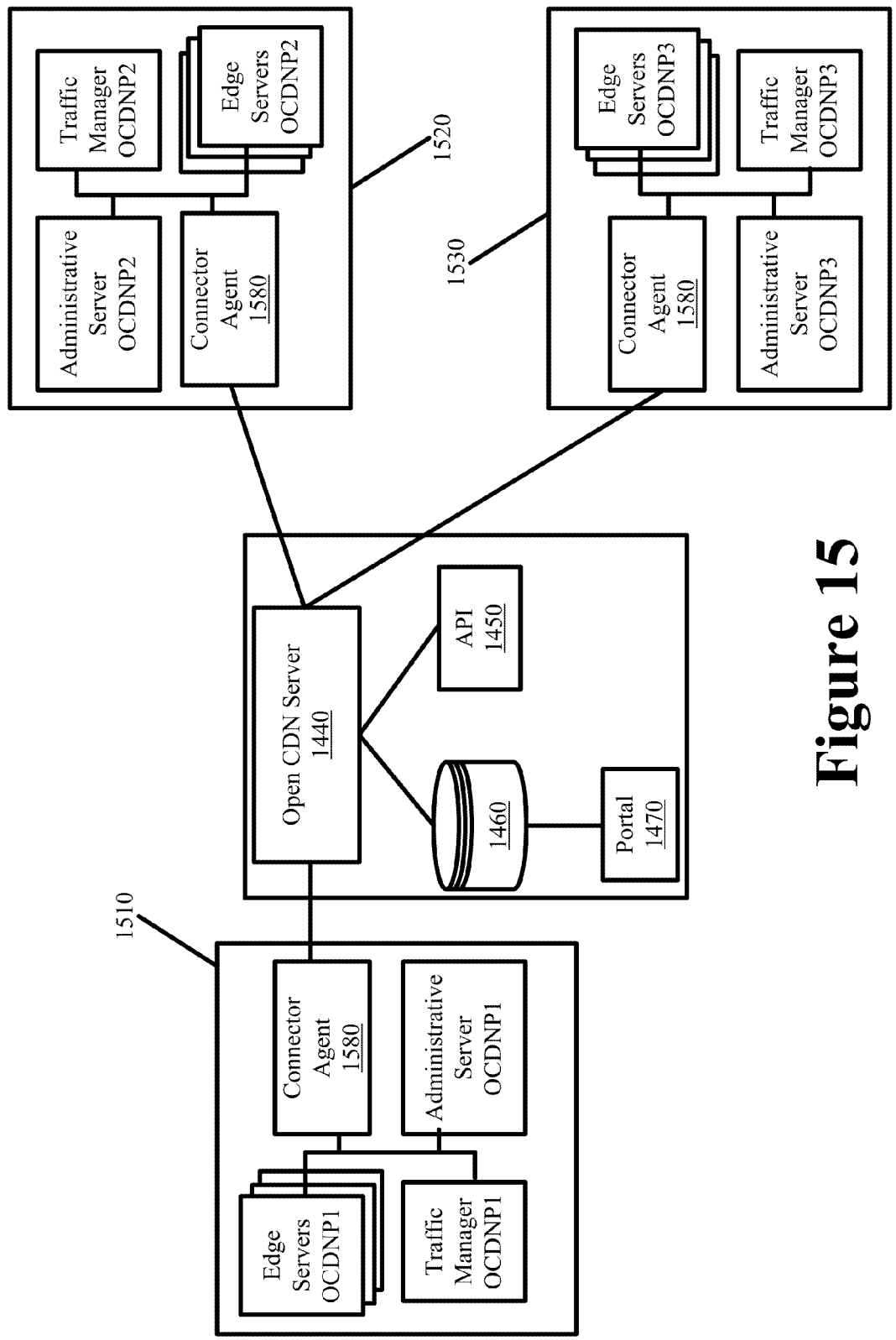
FIG. 15 presents an alternative centralized framework for implementing the Open CDN platform in accordance with some embodiments.

FIG. 15 presents an alternative centralized framework for implementing the Open CDN platform in accordance with some embodiments. In FIG. 15, a third party 1510 administers the Open CDN platform independent of the OCDNP 1520, 1530, and 1540. Specifically, the third party 1510 administers the Open CDN server 1440, the Open CDN API 1450, the database 1460, and the interface portal 1470. This framework prevents any of the OCDNPs 1520, 1530, and 1540 from having a disproportionate influence in the Open CDN platform. The operation is nevertheless the same as that described above with reference to FIG. 14 wherein each OCDNP 1520, 1530, and 1540 communicably couples to the Open CDN server 1440 using a connector agent 1580 for access to the capacity exchange and for access to services including capacity allocation, capacity configuration, command propagation, statistical data reporting, etc.

Figure 16:
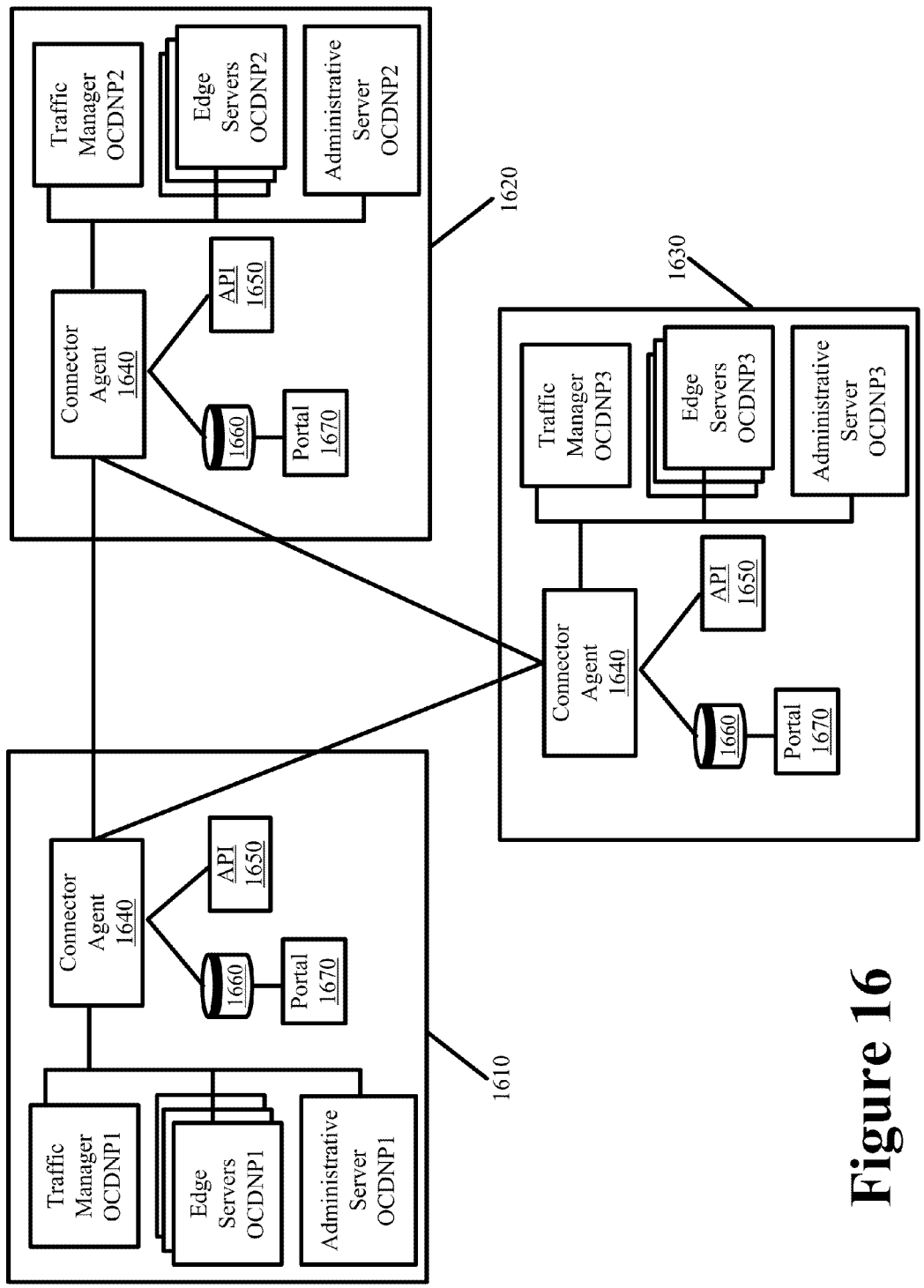
FIG. 16 illustrates a distributed framework for implementing the Open CDN platform in accordance with some embodiments.

FIG. 16 illustrates a distributed framework for implementing the Open CDN platform in accordance with some embodiments. In this distributed framework, each OCDNP 1610, 1620, and 1630 is enhanced with a connector agent 1640, Open CDN API 1650, database 1660, and interface portal 1670.

By virtue of the distributed framework, the capacity exchange is also distributed. In some embodiments, the database 1660 at each particular OCDNP stores the service instances that the particular OCDNP has published or has made available to the other OCDNPs. The connector agents 1640 then share the published service instance information with each other such that each OCDNP has knowledge of the available service instances in the Open CDN platform. Once a desired service instance is identified and a purchase offer is submitted by an OCDNP buyer, the connector agent 1640 of the OCDNP buyer conveys the purchase offer to the connector agent 1640 of the OCDNP seller and the offer can be accepted, rejected, or counter offered. In this manner, the connector agents 1640 directly broker the buying and selling of capacity in the federated Open CDN platform. In some other embodiments, the connector agents 1640 do not share the published service instance information with one another. Instead, an OCDNP buyer specifies a query for a desired service instance and the connector agent 1640 for the OCDNP buyer issues the query to the connector agents 1640 of the other OCDNPs participating in the Open CDN platform. The connector agents 1640 receiving the query scan the database 1660 to identify whether their native OCDNP has published a service instance that meets the qualifications specified in the query. When a suitable service instance is identified, the connector agent 1640 of the OCDNP seller is contacts the connector agent 1640 of the OCDNP buyer to broker the sale of the service instance.

The connector agents and the Open CDN APIs also perform the various mappings for passing configurations, commands, and statistical data inter-OCDNP. This may include performing the mappings described in FIGS. 10 and 11 whereby the connector agent and Open CDN API of a first OCDNP map native identifiers and formatting of the first OCDNP to intermediary Open CDN identifiers and formats. The connector agent of the first OCDNP then passes the Open CDN identifiers and formats to a connector agent of a second OCDNP. The connector agent and Open CDN API of the second OCDNP then remap the Open CDN identifiers and formats to the native identifiers and formatting of the second OCDNP. It should be noted that the connector agents and Open CDN APIs may be used to perform a direct mapping between the native identifiers and formats without use of the intermediary Open CDN identifiers and formats.

The database 1660 can be used to track which native configurations are deployed to which foreign OCDNPs. The database 1660 can also be used to collect statistical data via the connector agents 1640 from foreign OCDNPs for configurations deployed to those foreign OCDNPs.

Figure 17:
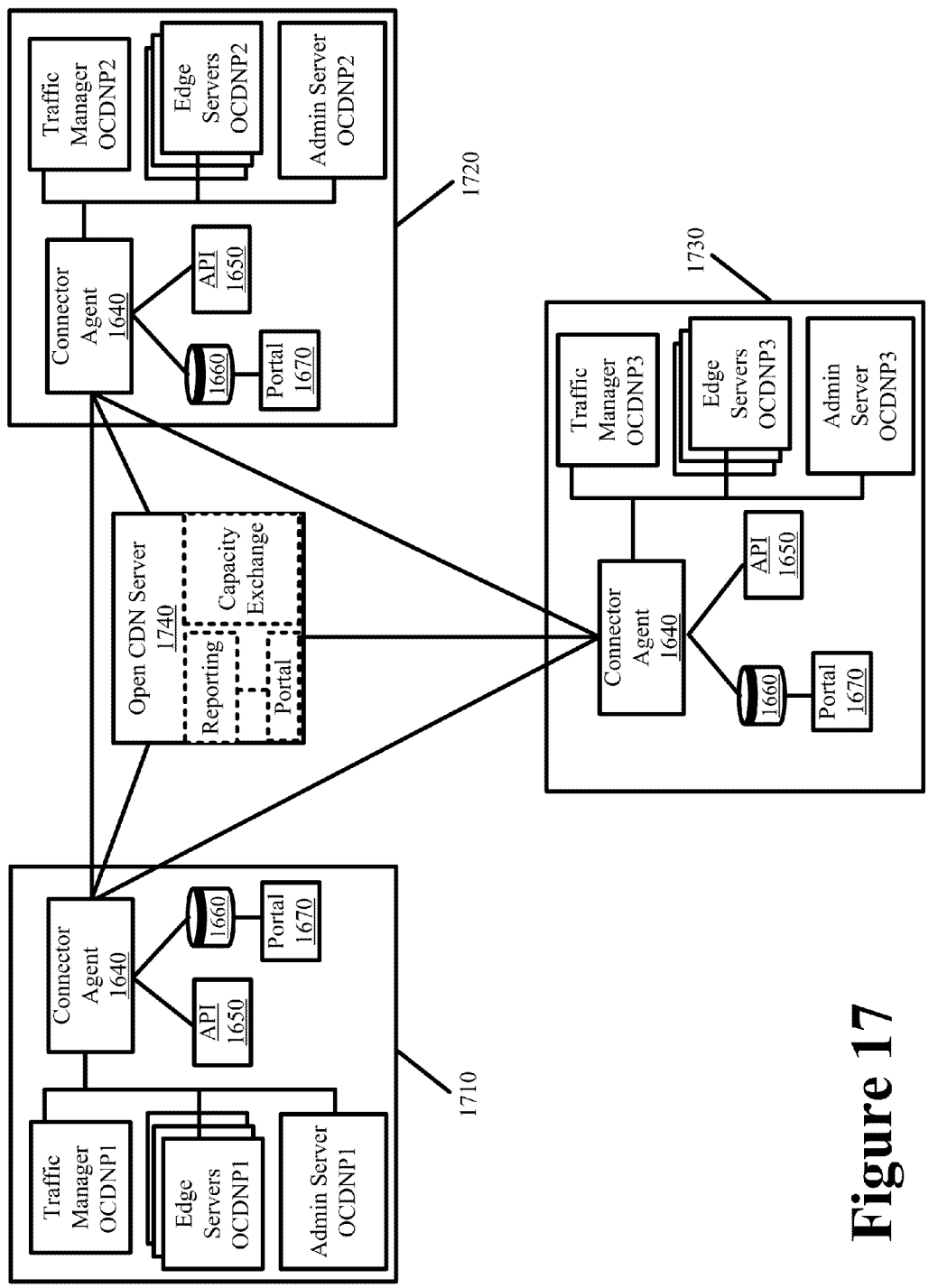
FIG. 17 presents a hybrid framework for implementing the Open CDN platform in accordance with some embodiments.

FIG. 17 presents a hybrid framework for implementing the Open CDN platform in accordance with some embodiments. In this framework, each OCDNP 1710, 1720, and 1730 is enhanced with the connector agent 1640, Open CDN API 1650, database 1660, and portal 1670 as in FIG. 16. However, the framework also includes Open CDN server 1740 that hosts the capacity exchange. Therefore, each connector agent 1640 directly communicates with the Open CDN server 1740 when intercommunications involve the buying, selling, and trading of capacity. Additionally, the Open CDN server 1740 can be used to perform the statistical data aggregation and reporting for the Open CDN platform. However, the connector agents 1640 can directly communicate with one another when passing configurations or commands for configurations deployed to foreign OCDNPs.

While FIGS. 14-17 present various centralized and decentralized frameworks with which the Open CDN platform can be implemented, the nature of the Open CDN platform allows for even more framework variations and implementations. Accordingly, it should be apparent to one of ordinary skill in the art that other frameworks may be used to implement the Open CDN platform in addition to or instead of those frameworks presented above.

As illustrated through the various frameworks above, an OCDNP can participate in the Open CDN platform with minimal change to its existing infrastructure and configuration. In fact, each OCDNP maintains control of the definition, configuration, and allocation of its own infrastructure even when participating in the Open CDN platform. Each OCDNP controls what portions of its CDN are exposed and assimilated into the Open CDN platform for use by others. Accordingly, each OCDNP can operate a large portion of its CDN privately while exposing only a small subset the CDN to the Open CDN platform. The exposed portions can be mapped in arbitrary ways to create different logical allocations on top of actual physical infrastructure. Each OCDNP can dynamically add, remove, or modify its own infrastructure. Traffic management and capacity allocations will adjust with the current state of the OCDNP infrastructure allocation. Accordingly, OCDNPs can participate in the Open CDN platform while continuing to operate a majority of their CDN independent of the Open CDN platform. OCDNPs can retain their own set of customers and participate in the Open CDN platform to sell unused capacity or purchase additional capacity. Customers need not be aware that their configurations are deployed across one or more CDNs.

In some embodiments, the Open CDN platform can open the capacity exchange directly to customers. This allows the Open CDN platform to become its own OCDNP. In some such embodiments, customers that are content originators can access the interface portal of the Open CDN platform to directly purchase capacity that meets their requirements irrespective of who the underlying OCDNPs for that capacity are. A configuration is then uploaded using the interface portal and automatically deployed to the acquired resources.

Some benefits of this service provider model include offloading customer management from the OCDNPs to the Open CDN platform. Also, the capacity exchange allows customers the ability to instantly price compare the service instances of multiple OCDNPs in order to select the service instance that best meets their needs. It is also recognized that some OCDNP's will choose to deploy CDN technology for infrastructure augmentation and cost optimization purposes and not wish to directly establish the commercial processes, staff, and practices of selling CDN services as an OCDNP to content publishers directly, instead choosing to leverage the existence of the Open CDN platform as a channel for driving traffic onto their CDN infrastructure thereby monetizing their infrastructure investment through $3^{rd}$ party commercial services.

V. Server System

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine is meant in its broadest sense, and can include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Furthermore, almost everywhere that a server is identified as a component of the embodied invention, it is understood that the server may be a single physical machine, or a cluster of multiple physical machines performing related functions, or virtualized servers co-resident on a single physical machine, or various combinations of the above.

Figure 18:
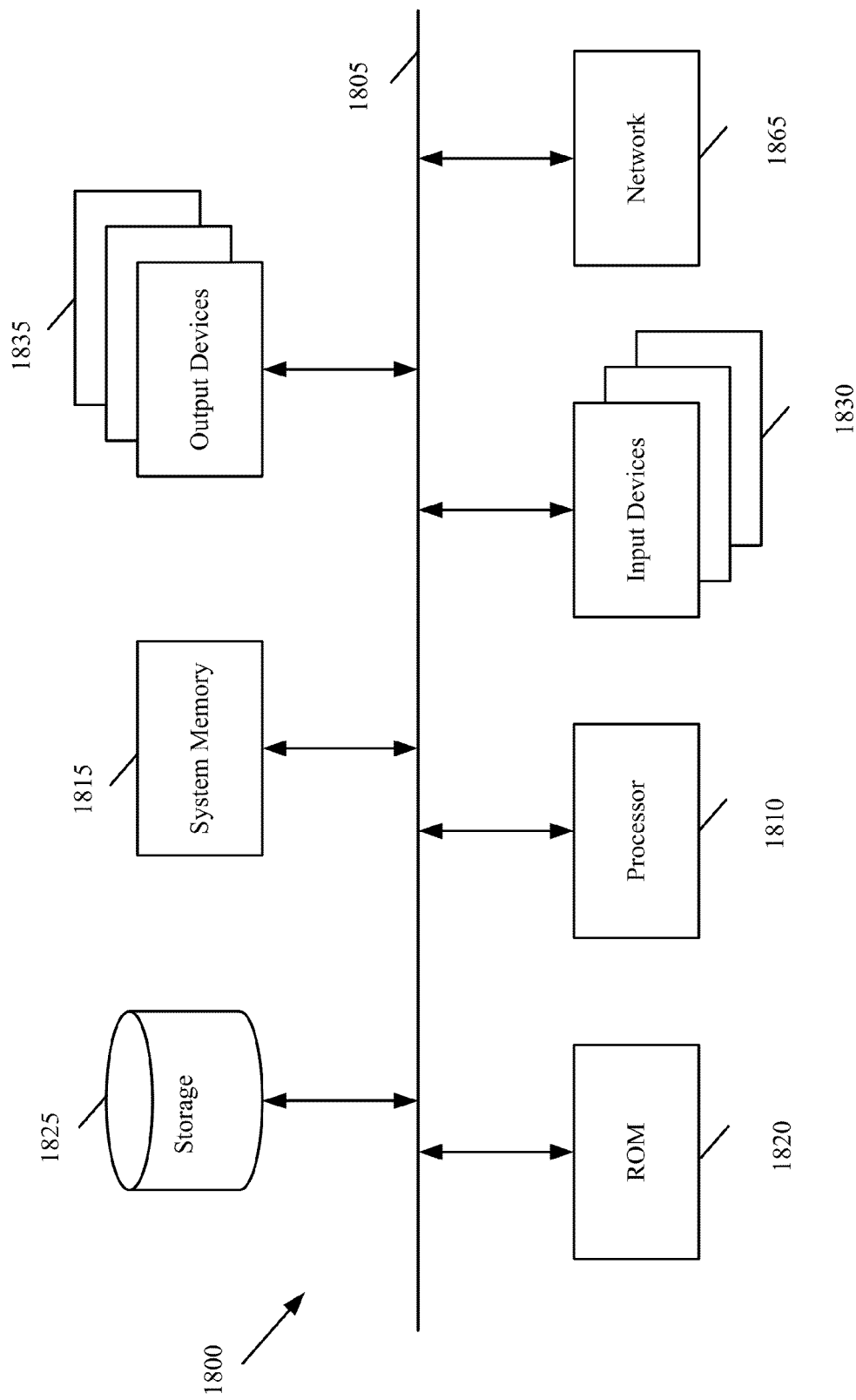
FIG. 18 illustrates a computer system or server with which some embodiments are implemented.

FIG. 18 illustrates a computer system or server with which some embodiments are implemented. Such a computer system includes various types of computer readable mediums and interfaces for various other types of computer readable mediums that implement the various processes and modules described above (e.g., exchange server, Open CDN API, database, and interface portal). Computer system 1800 includes a bus 1805, a processor 1810, a system memory 1815, a read-only memory 1820, a permanent storage device 1825, input devices 1830, and output devices 1835.

The bus 1805 collectively represents all system, peripheral, and chipset buses that communicatively connect the numerous internal devices of the computer system 1800. For instance, the bus 1805 communicatively connects the processor 1810 with the read-only memory 1820, the system memory 1815, and the permanent storage device 1825. From these various memory units, the processor 1810 retrieves instructions to execute and data to process in order to execute the processes of the invention. The processor 1810 is a processing device such as a central processing unit, integrated circuit, graphical processing unit, etc.

The read-only-memory (ROM) 1820 stores static data and instructions that are needed by the processor 1810 and other modules of the computer system. The permanent storage device 1825, on the other hand, is a read-and-write memory device. This device is a non-volatile memory unit that stores instructions and data even when the computer system 1800 is off. Some embodiments of the invention use a mass-storage device (such as a magnetic or optical disk and its corresponding disk drive) as the permanent storage device 1825.

Other embodiments use a removable storage device (such as a flash drive) as the permanent storage device Like the permanent storage device 1825, the system memory 1815 is a read-and-write memory device. However, unlike storage device 1825, the system memory is a volatile read-and-write memory, such a random access memory (RAM). The system memory stores some of the instructions and data that the processor needs at runtime. In some embodiments, the processes are stored in the system memory 1815, the permanent storage device 1825, and/or the read-only memory 1820.

The bus 1805 also connects to the input and output devices 1830 and 1835. The input devices enable the user to communicate information and select commands to the computer system. The input devices 1830 include alphanumeric keypads (including physical keyboards and touchscreen keyboards), pointing devices (also called "cursor control devices"). The input devices 1830 also include audio input devices (e.g., microphones, MIDI musical instruments, etc.). The output devices 1835 display images generated by the computer system. The output devices include printers and display devices, such as cathode ray tubes (CRT) or liquid crystal displays (LCD).

Finally, as shown in FIG. 18, bus 1805 also couples computer 1800 to a network 1865 through a network adapter (not shown). In this manner, the computer can be a part of a network of computers (such as a local area network ("LAN"), a wide area network ("WAN"), or an Intranet, or a network of networks, such as the internet. For example, the computer 1800 may be communicably coupled through the network 1865 to an ingest server, mid-tier server, edge server, content provider streaming server, or end user device.

As mentioned above, the computer system 1800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for facilitating intercommunication in a federation comprising a plurality of independently operated content delivery network (CDN) participants, the method comprising:

allocating to a first CDN from a second CDN of the plurality of CDN participants, capacity that the second CDN makes available for use in serving content of a first CDN customer on behalf of the first CDN;

mapping a configuration of the first CDN customer, the configuration comprising a first plurality of operations used in configuring capacity of the first CDN based on a first configuration language that the first CDN defines for capacity configuration of the first CDN, wherein mapping the configuration of the first CDN customer comprises generating a modified configuration comprising a conversion of the first plurality of operations to a second plurality of operations of a second configuration language that the second CDN defines for capacity configuration of the second CDN;

passing to the second CDN, the modified configuration with a first CDN identifier representing the first CDN from which the modified configuration is passed, a second capacity identifier identifying the capacity of the second CDN to which the modified configuration is to be deployed, and a third CDN customer identifier identifying the first CDN customer whose configuration is to be deployed to the capacity identified by the second capacity identifier; and configuring the allocated capacity of the second CDN with the modified configuration, wherein the second plurality of operations of the modified configuration configure the capacity to serve content of the first CDN customer on behalf of the first CDN.

2. The method of claim 1 further comprising assigning a unique first CDN identifier to identify each of the plurality of CDNs in a system.

3. The method of claim 2 further comprising assigning a unique third CDN customer identifier to each customer of a CDN with a configuration that is deployed to capacity of another CDN.

4. The method of claim 3 further comprising assigning a unique second capacity identifier to identify each instance of capacity that a CDN of the plurality of CDNs has made available for use by another CDN.

5. The method of claim 1, further comprising configuring a traffic management function of the first CDN to resolve requests for content of the first CDN customer to the second CDN.

6. The method of claim 5, wherein configuring the traffic management function comprises inserting a (CNAME) for resolving requests for content of the first CDN customer received at the first CDN to the second CDN.

7. The method of claim 1 further comprising receiving a purge request directed to the configuration at the first CDN from the first CDN customer.

8. The method of claim 7 further comprising passing from the first CDN to the second CDN, the purge request with at least the third CDN customer identifier.

9. The method of claim 1 further comprising passing from the second CDN to the first CDN, at least the third CDN customer identifier with a performance report identifying performance of the configuration on the capacity of the second CDN.

10. The method of claim 9 further comprising presenting the performance report through an interface of the first CDN to the first CDN customer.

11. A method for facilitating intercommunication in a federation comprising a plurality of independently operated distributed platform participants, the method comprising:
    assigning a first plurality of service instance identifiers to uniquely identify different instances of capacity that a federation participant makes available to other federation participants;
    assigning a second plurality of customer identifiers to uniquely identify different customers of any federation participant;
    mapping a configuration for a customer of a first federation participant that is formatted according to a native format of the first federation participant to a native format of a second federation participant;
    deploying the configuration for the customer from the first federation participant to run on an instance of the capacity of the second federation participant, wherein deploying a configuration comprises passing (i) a particular service instance identifier of the first plurality of service instance identifiers identifying the instance of capacity of the second federation participant on which the configuration is to run, (ii) a particular customer identifier of the second plurality of customer identifiers identifying the customer of the first federation participant, and (iii) the configuration that is mapped from the native format of the first federation participant to the native format of the second federation participant; and
    reporting performance for running the configuration on the instance of capacity of the second federation participant to the first federation participant by passing from the second federation participant to the first federation participant, (i) performance measurements relating to execution of the configuration on the instance of the capacity of the second federation participant, (ii) the particular customer identifier identifying the customer of the first federation participant to which the performance measurements relate, and (iii) the particular service instance identifier identifying the instance of capacity from which the performance measurements were derived.

12. The method of claim 11 further comprising passing a command with the particular customer identifier and the particular service instance identifier to the second federation participant, wherein passing the command with the particular customer identifier and the particular service instance identifier identifies that the command applies to the configuration of the customer running on the instance of capacity of the second federation participant.

13. The method of claim 12, wherein said command modifies operation of the configuration on the instance of capacity of the second federation participant.

14. The method of claim 11 further comprising providing an (API) comprising a plurality of rules for mapping the configuration between native formats of the first federation participant and the second federation participant.

15. The method of claim 11, wherein the first federation participant displays the performance of the configuration to the customer by converting from the particular customer identifier to an internal identifier used by the first federation participant to identify the customer.

16. The method of claim 11 further comprising reporting to the customer, the performance of the configuration through an interface of the first federation participant.

17. The method of claim 16, wherein reporting performance of the configuration comprises detailing overall performance of the configuration by combining the performance measurements from the report with performance measurements from running the configuration on at least one instance of capacity provided by the first federation participant.

18. The method of claim 16, wherein reporting the performance of the configuration comprises mapping the performance measurements from the particular customer identifier to an account of the customer at the first federation participation.

19. The method of claim 11 further comprising modifying a routing configuration of the first federation participant by at least one of resolving, redirecting, and forwarding a request for content of the customer from the first federation participant to the second federation participant.

* * * * *